US012767461B2

(12) United States Patent
Fowler et al.

(10) Patent No.: US 12,767,461 B2
(45) Date of Patent: Oct. 20, 2026

(54) COMPACT AUTOMATIC PRODUCT PART LOADER

(71) Applicant: Haas Automation, Inc., Oxnard, CA (US)

(72) Inventors: Zachary Fowler, Camarillo, CA (US); Michael Krzesni, Ventura, CA (US); Gene F. Haas, Oxnard, CA (US)

(73) Assignee: Haas Automation, Inc., Oxnard, CA (US)

( * ) Notice: Subject to any disclaimer, the term of this patent is extended or adjusted under 35 U.S.C. 154(b) by 841 days.

(21) Appl. No.: 18/303,481

(22) Filed: Apr. 19, 2023

(65) Prior Publication Data

US 2024/0059504 A1 Feb. 22, 2024

Related U.S. Application Data

(60) Provisional application No. 63/399,571, filed on Aug. 19, 2022.

(51) Int. Cl.
*B65G 47/90* (2006.01)

(52) U.S. Cl.
CPC .................................. *B65G 47/905* (2013.01)

(58) Field of Classification Search
CPC .... B65G 47/905; B65G 47/90; B65G 47/902; B65G 47/907
USPC .......................................................... 294/164
See application file for complete search history.

(56) References Cited

U.S. PATENT DOCUMENTS

| | | | | | |
|---|---|---|---|---|---|
| 4,041,677 | A * | 8/1977 | Reid | B65B 35/44 | 53/553 |
| 4,527,685 | A * | 7/1985 | Welder | B65G 37/02 | 198/346.2 |
| 4,652,204 | A * | 3/1987 | Arnett | F41H 11/16 | 901/17 |
| 5,549,442 | A * | 8/1996 | Crorey | B65G 47/907 | 212/203 |
| 6,213,853 | B1 * | 4/2001 | Gonzalez-Martin | H10P 70/15 | 257/E21.228 |
| 7,191,578 | B2 * | 3/2007 | Lucido | A21C 9/08 | 53/448 |
| 2009/0263218 | A1 * | 10/2009 | Katsuyama | B25J 15/0616 | 414/225.01 |
| 2015/0314455 | A1 * | 11/2015 | Morency | B65G 63/002 | 414/800 |
| 2016/0280470 | A1 * | 9/2016 | Zhang | B65G 47/902 | |
| 2021/0237478 | A1 * | 8/2021 | Kollata | B41J 13/10 | |
| 2021/0323777 | A1 * | 10/2021 | Magri | B25J 15/0061 | |
| 2022/0227002 | A1 * | 7/2022 | Kouno | B25J 11/0075 | |

* cited by examiner

*Primary Examiner* — Paul T Chin
(74) *Attorney, Agent, or Firm* — Eversheds Sutherland (US) LLP

(57) ABSTRACT

Automated Part Loader (APL) systems and methods for loading and unloading product parts within a machine, e.g., a vertical mill, are provided. The APL system is compact and has a smaller footprint compared with current automated loading systems. The APL system may include a spring-based rotatable loader arm that may be actuated to rotate, e.g., via low voltage motors, relative to a loading table, e.g., 90 degrees, and extend linearly through a side door of the machine for loading and unloading product parts. The loader arm may include a pair of pneumatic grippers configured for picking up and releasing product parts.

20 Claims, 32 Drawing Sheets

COMPACT AUTOMATIC PRODUCT PART LOADER

CROSS-REFERENCE TO RELATED APPLICATIONS

This application claims the benefit of priority of U.S. Provisional Patent Application No. 63/399,571, filed Aug. 19, 2022, the entire contents of which are incorporated herein by reference.

FIELD OF USE

The present disclosure is directed to automated systems and methods for loading and unloading product parts.

BACKGROUND

Current automatic systems for loading and unloading product parts within a machine include complex robots, which have a large foot print, and block access for operators to the front door to the machine based on the required position of the robot to the machine. Accordingly, an operator could not use the machine without the complex robot. In addition, these complex robots are costly, heavy, and require a lot of power to provide sufficient torque to move the product parts. Such robots are further limited by its ability to reach into the machine, and must be made larger to provide additional reach capabilities, thereby increasing the footprint.

In view of the foregoing drawbacks of previously known systems and methods, there exists a need for an improved automated parts loader.

DETAILED DESCRIPTION

Automated Part Loader (APL) systems and methods for loading and unloading product parts within a machine, e.g., a vertical mill or lathe, are provided. The APL systems described herein are compact and have a smaller footprint compared with current automated loading systems. For example, the APL system may include a rotatable loader arm that may rotate relative to a loading table, e.g., 90 degrees, and extend linearly into a side door of the machine for loading and unloading product parts, thereby not obstructing access to the front door of the machine for operators during operation. The loader arm includes one or more pneumatic grippers (a pair in the illustrated embodiment) configured for picking up and releasing product parts, e.g., small products that have a size of up to 8 cubic inches and a weight of up to 3 lbs. Accordingly, rotation of the loader arm requires minimal torque due to the size and weight of the product parts being loaded and unloaded, and thus may be provided by low voltage DC motors. Using low torque motors that have lower power consumption compared to robotic arms also has the advantage of being lower cost and smaller. Moreover, the loader arm may include a spring assembly, e.g., a gas spring mechanism, configured to facilitate rotation of the loader arm, thereby reducing the amount of voltage required by the motors to drive rotation of the loader arm, as well as to dampen motion of the loader arm to reduce or eliminate a bounce effect of the loader arm as the loader arm starts and stops rotational motion. As will be understood by a person having ordinary skill in the art, the APL system may be scaled smaller or bigger to provide accessibility while minimizing the amount of torque required to rotate the loader arm.

By being able to rotate between a loading/unloading configuration relative to the loading table and a loading/unloading configuration relative to the machine, as well as precise linear movements relative to the loading table and within the machine, the APL system herein may be compact with a smaller footprint compared to other complex robot systems which generally provide 6 degrees of freedom, and are more costly to manufacture. In addition, the APL system may be simply programmed to perform the automatic operations associated therewith via a central machine controller, such as the same central controller for the machine with which the APL system is operating, e.g., machine controller 700 described in further detail below with regard to FIG. 7. For example, the APL system may be programmed to automatically pick up an unmachined product part from the loading table while a product part is simultaneously being cut by the machine, pick up the machined product part from within the machine, drop off the unmachined product part within the machine, and then drop off the machined product part on the loading table while the machine cuts the next unmachined product part.

Figure 1A:
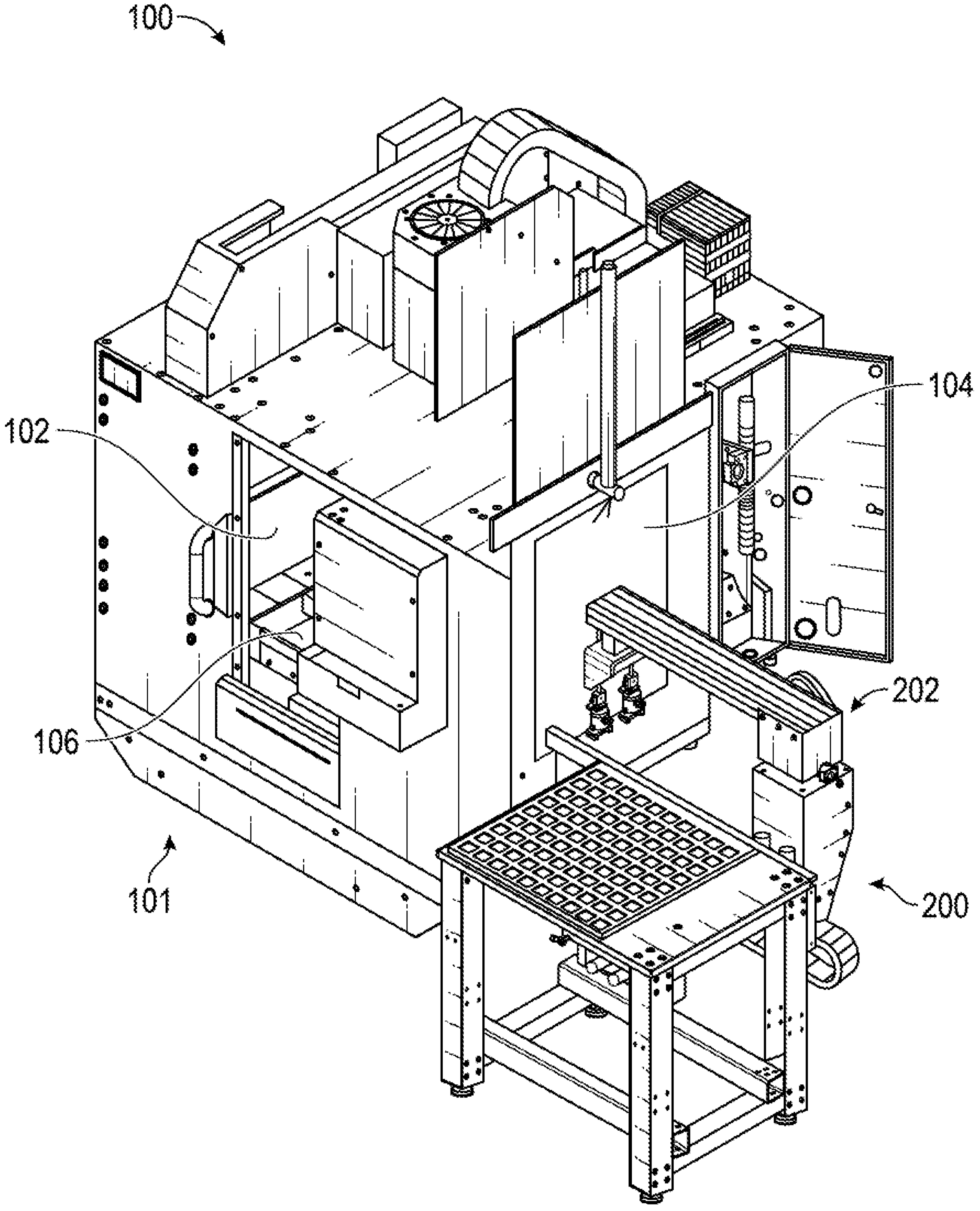
FIGS. 1A and 1B show an illustrative automated system for loading and unloading product parts constructed in accordance with the principles of the present disclosure.
Figure 1B:
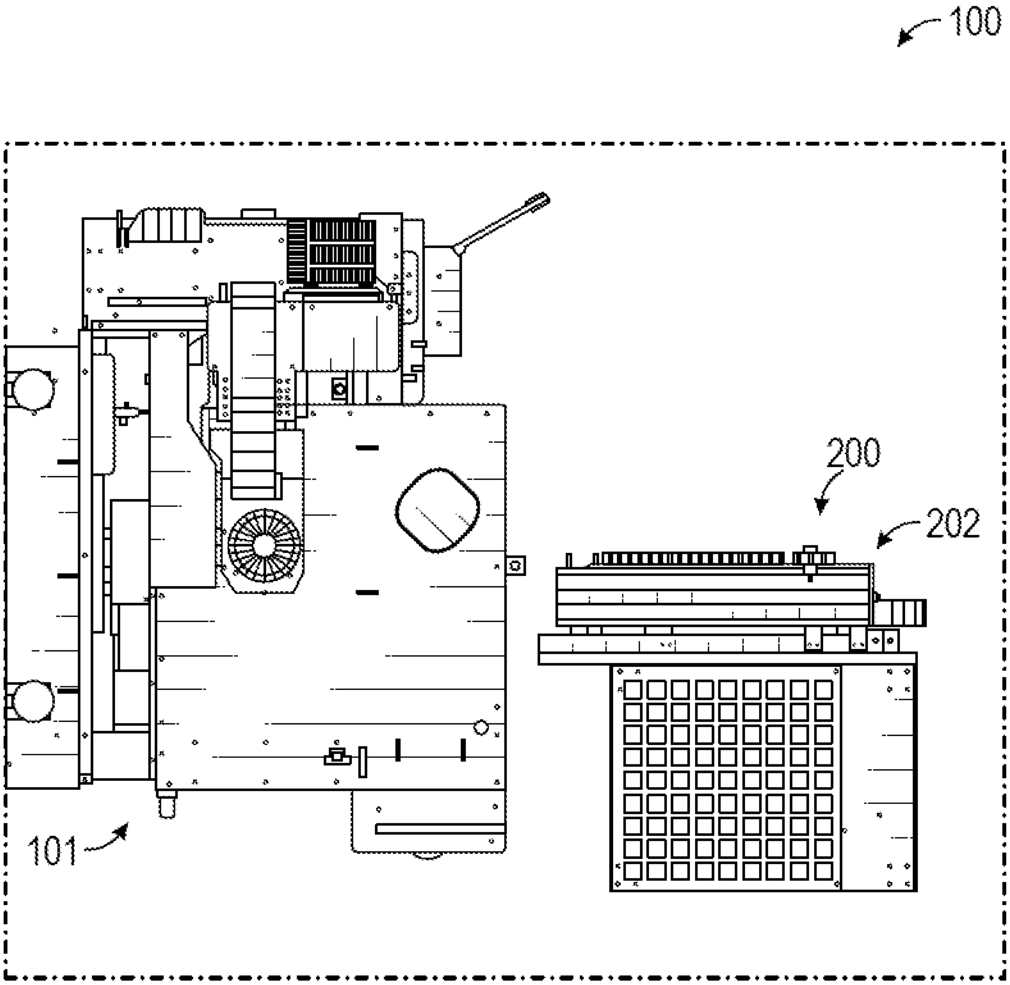

Referring now to FIGS. 1A and 1B, an illustrative APL system for loading and unloading product parts within a machine is provided. System 100 may include machine 101, e.g., a vertical mill, and automated loader assembly 200. Machine 101 may be configured to cut product parts, and may include front door 102 to provide access to an operator to the interior of machine 101. Moreover, machine 101 may include side door 104 sized and shaped to provide access to the interior of machine 101 to loader arm 202 of loader assembly 200, e.g., for loading and unloading of product parts, as described in further detail below. Machine 101 further may include vise 106, which is configured to hold the unfinished product parts that are dropped off by loader assembly 200, as well as finished product parts that are ready for pickup by loader assembly 200. Vise 106 may be programmed to move linearly within the interior of machine 101 to align the finished product part with loader assembly 200 for pickup, and to align itself with loader assembly 200 for receiving an unfinished product part. For example, vise 106 may be configured to move linearly in a direction perpendicular to the linear movement of the loader arm of loader assembly 200 within machine 101.

As shown in FIGS. 1A and 1B, loader assembly 200 may be positioned adjacent to machine 101, e.g., external to machine 101, for operation. As loader assembly 200 is lightweight and compact, it may easily be moved to the desired position relative to machine 101, e.g., via a plurality of wheels, a forklift, etc. In addition, loader assembly 200 may include a brake mechanism to maintain the position of loader assembly 200 relative to machine 101. The desired position of loader assembly 200 is such that the loader arm of loader assembly 200 is aligned with side door 104 of machine 101, such that the loader arm may linearly extend in and out of machine 101 via side door 104. As shown in FIG. 1B, a top plan view, loader assembly 200 may have a compact size of, for example, 4 feet by 5.5 feet. As described above, loader assembly 200 may be scaled bigger or smaller. As will be understood by a person having ordinary skill in the art, loader assembly 200 may have other dimensions, e.g., 4 feet by 4 feet, 4.5 feet by 4.5 feet, 5 feet by 5 feet, 5.5 feet by 5.5 feet, 4 feet by 5 feet, etc.

Figure 2A:
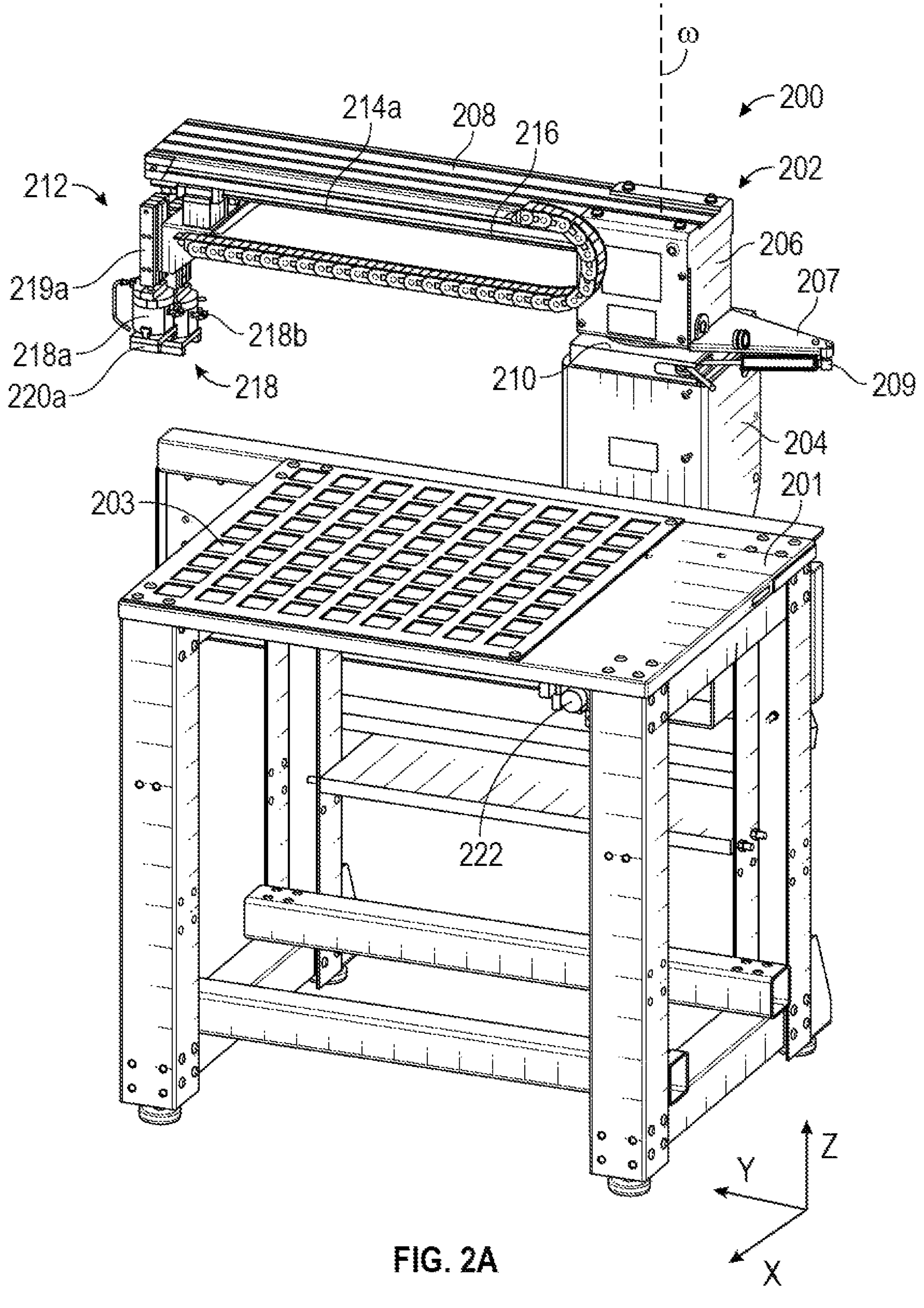
FIGS. 2A to 2C show an illustrative automated loader assembly in accordance with the principles of the present disclosure.
Figure 2B:
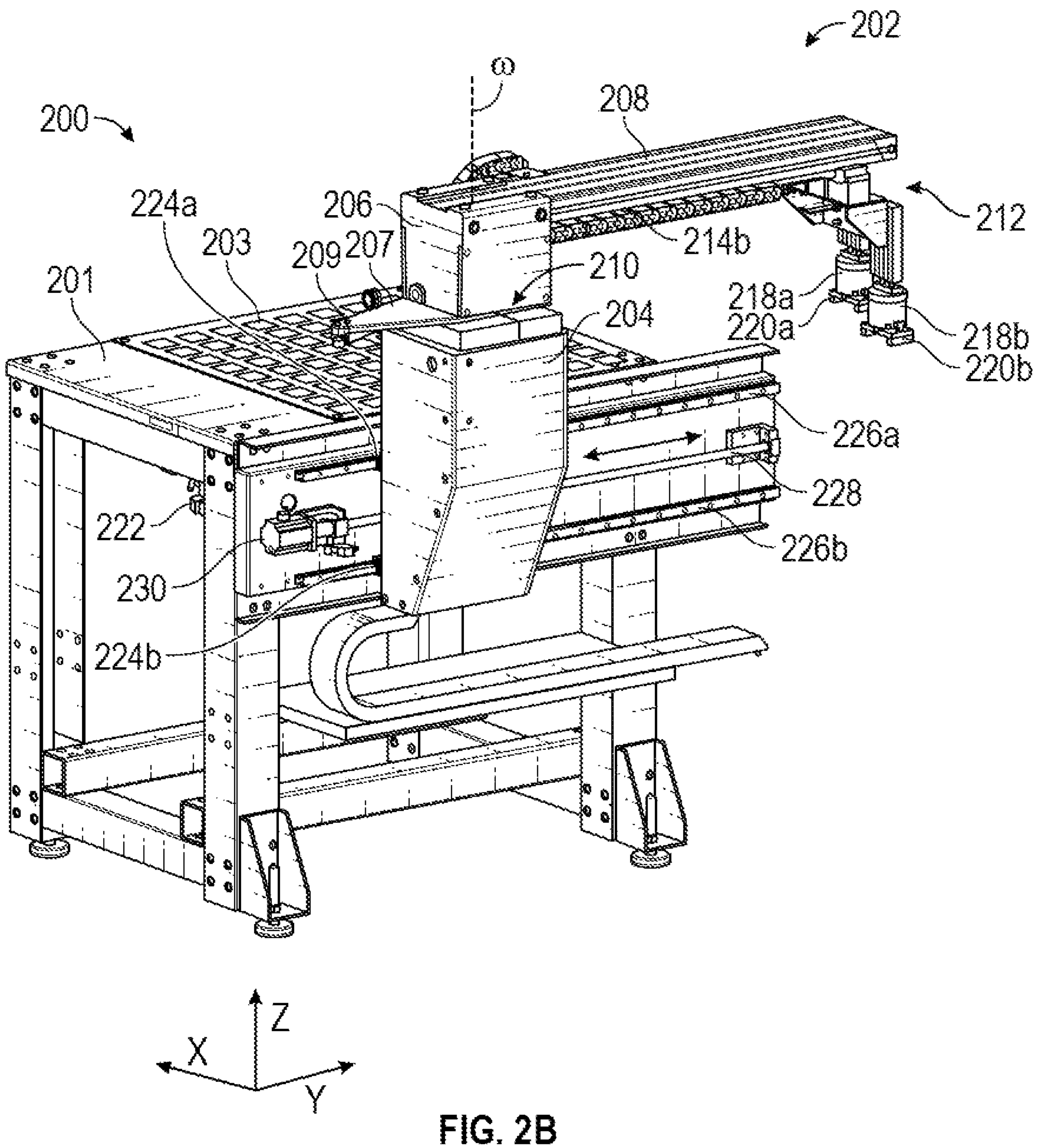
Figure 2C:
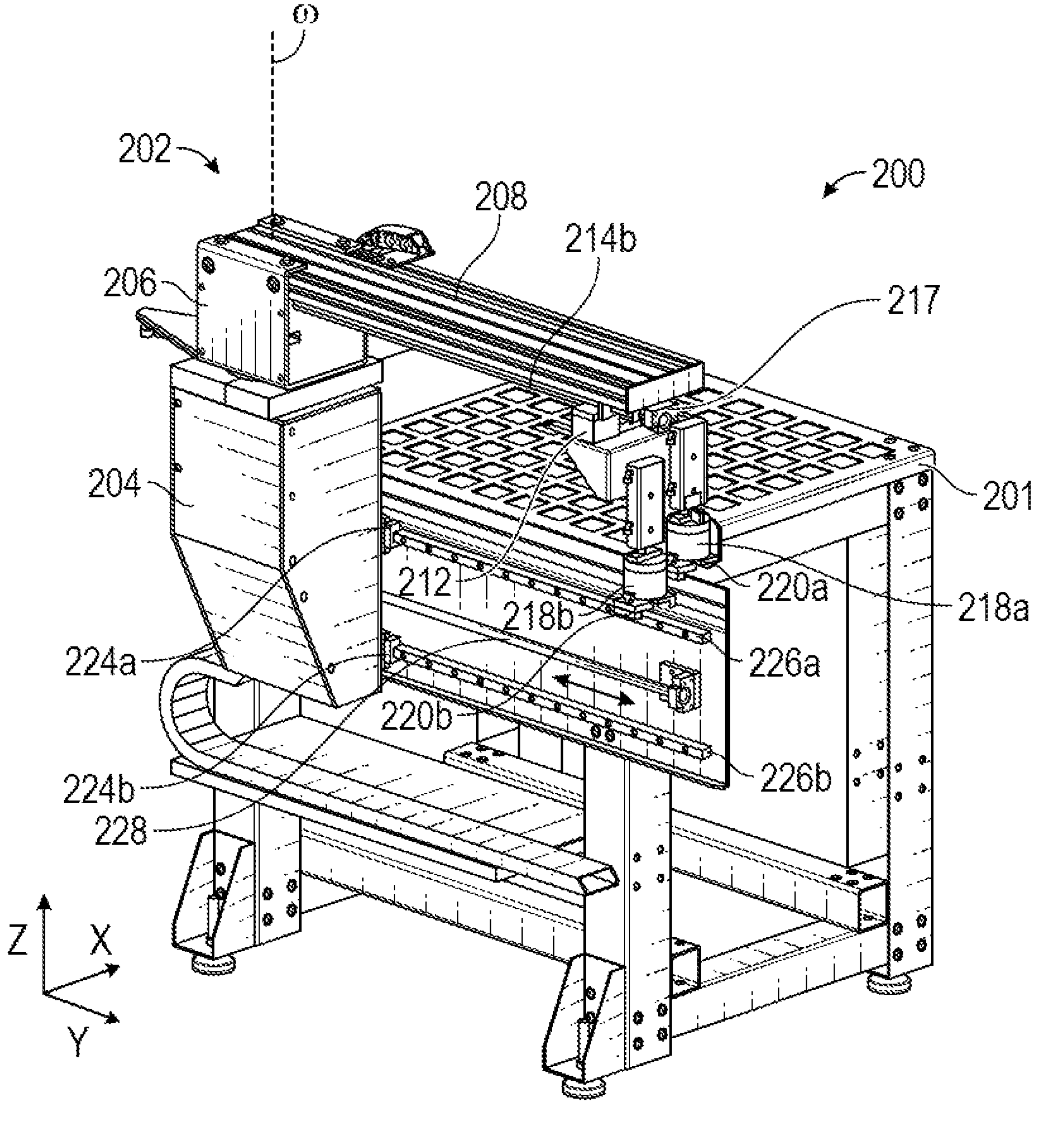
Figure 2E:
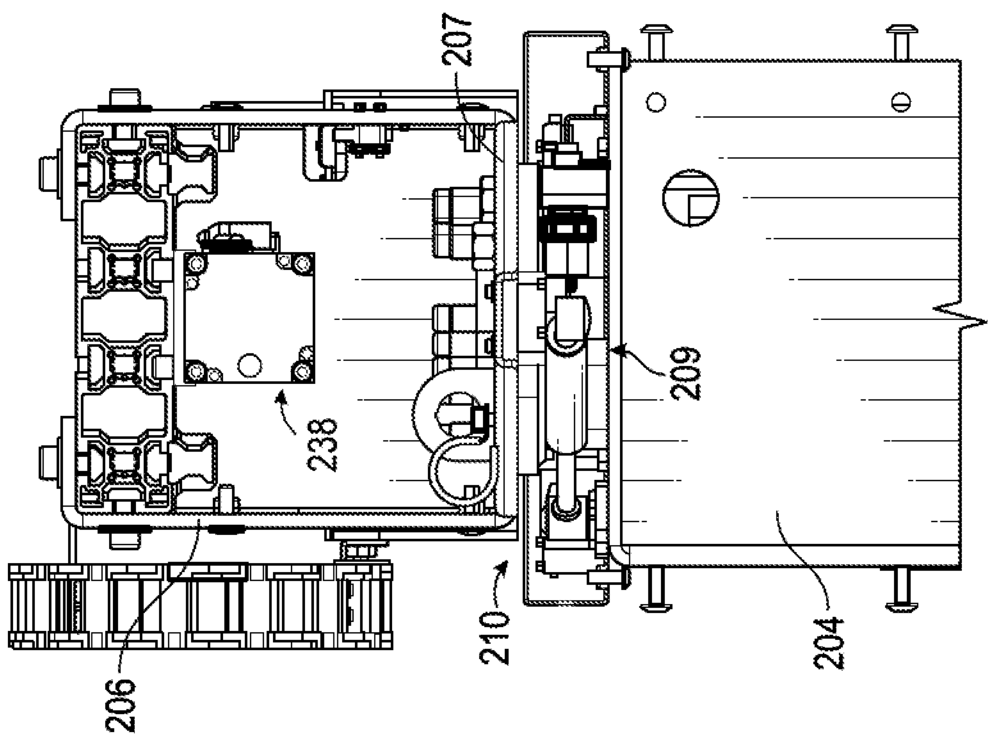
FIG. 2E shows illustrative motors for linearly moving the gripper assembly in accordance with the principles of the present disclosure.
Figure 2D:
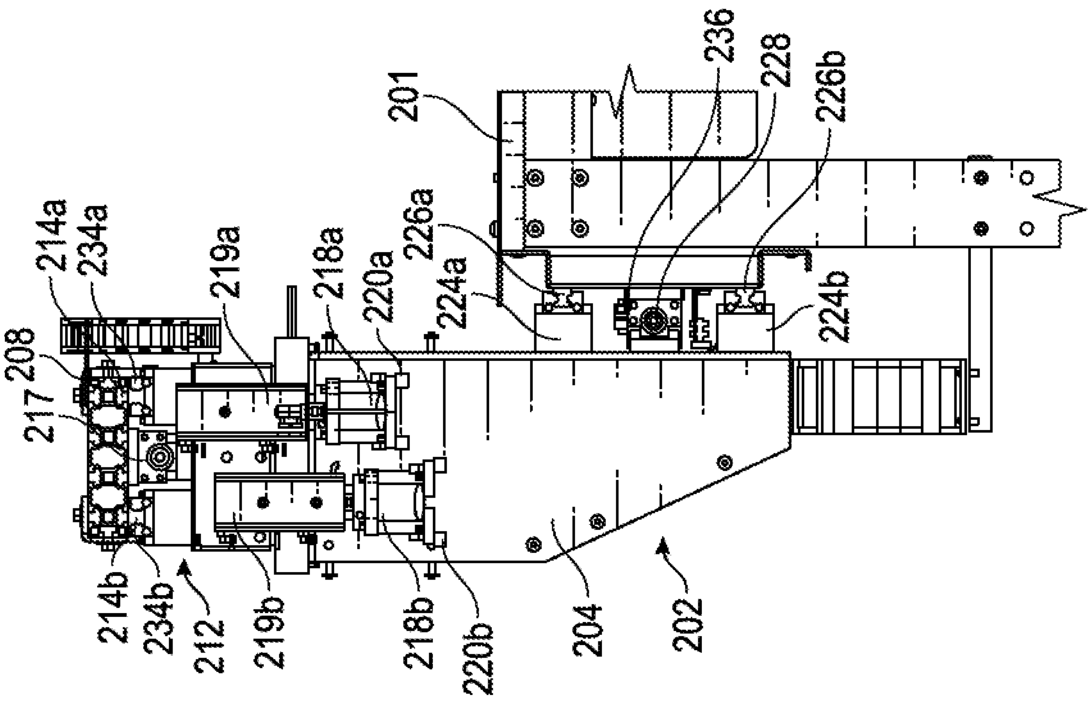
FIG. 2D is a front view of an illustrative loader arm of the automated loader assembly of FIGS. 2A to 2C.
Figure 2F:
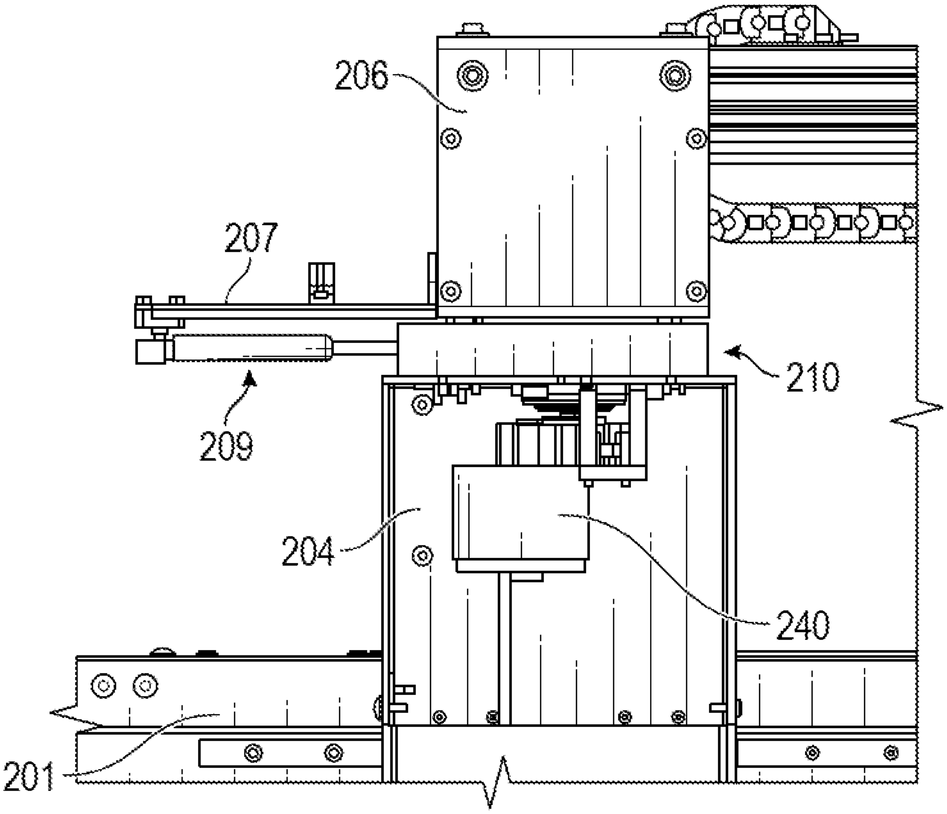
FIG. 2F shows an illustrative motor for actuating rotation of the loader arm in accordance with the principles of the present disclosure.
Figure 2G:
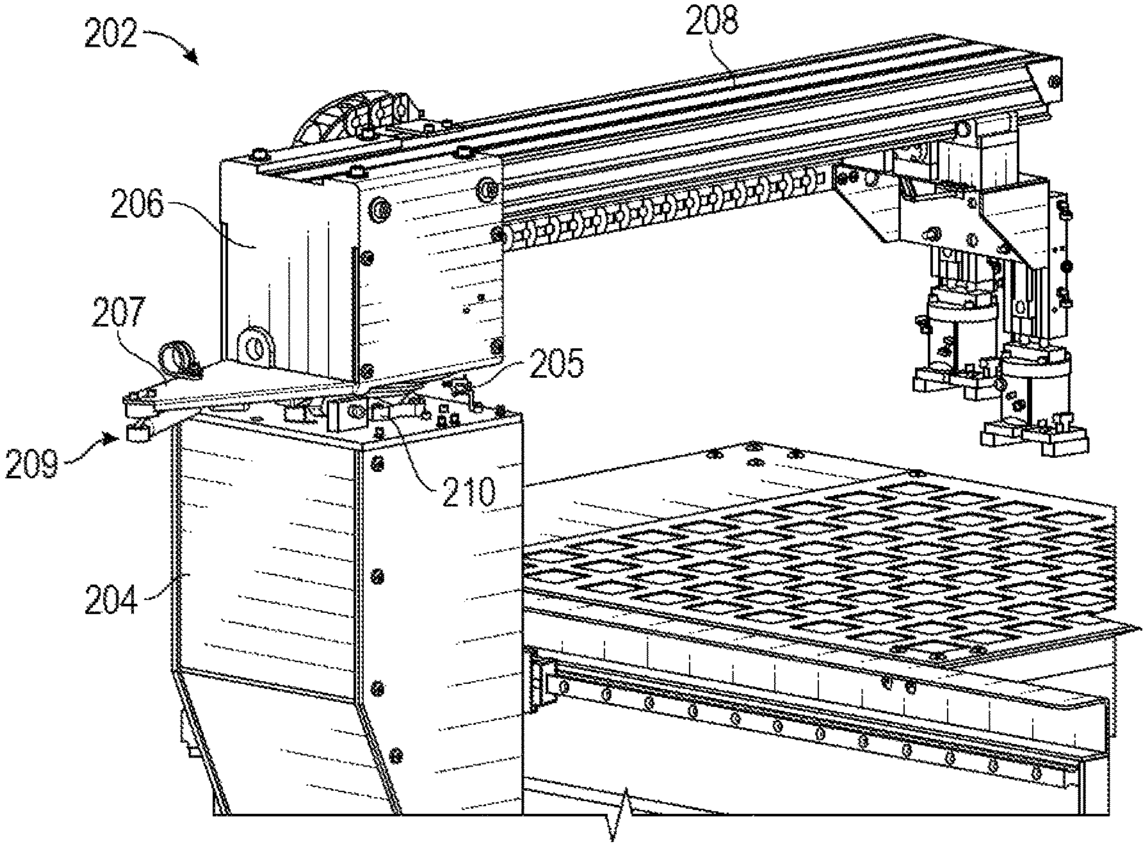
FIGS. 2G and 2H show an illustrative damping mechanism for rotation of the loader arm in accordance with the principles of the present disclosure.
Figure 2H:
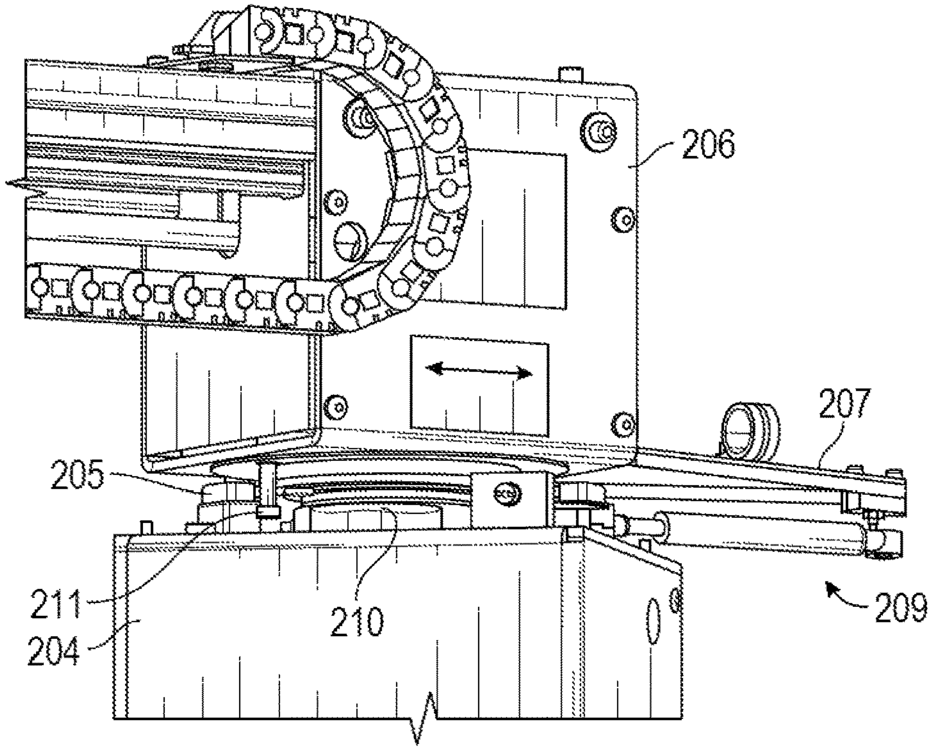
Figure 2J:
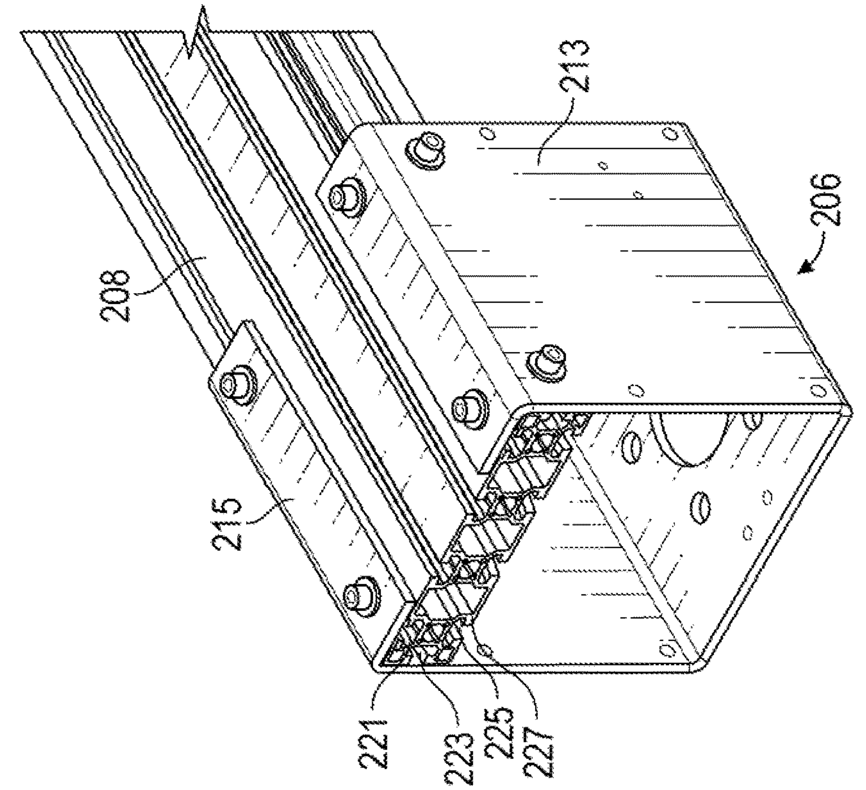
FIGS. 2I and 2J show an illustrative coupling mechanism of the extension portion of the loader arm in accordance with the principles of the present disclosure.
Figure 2I:
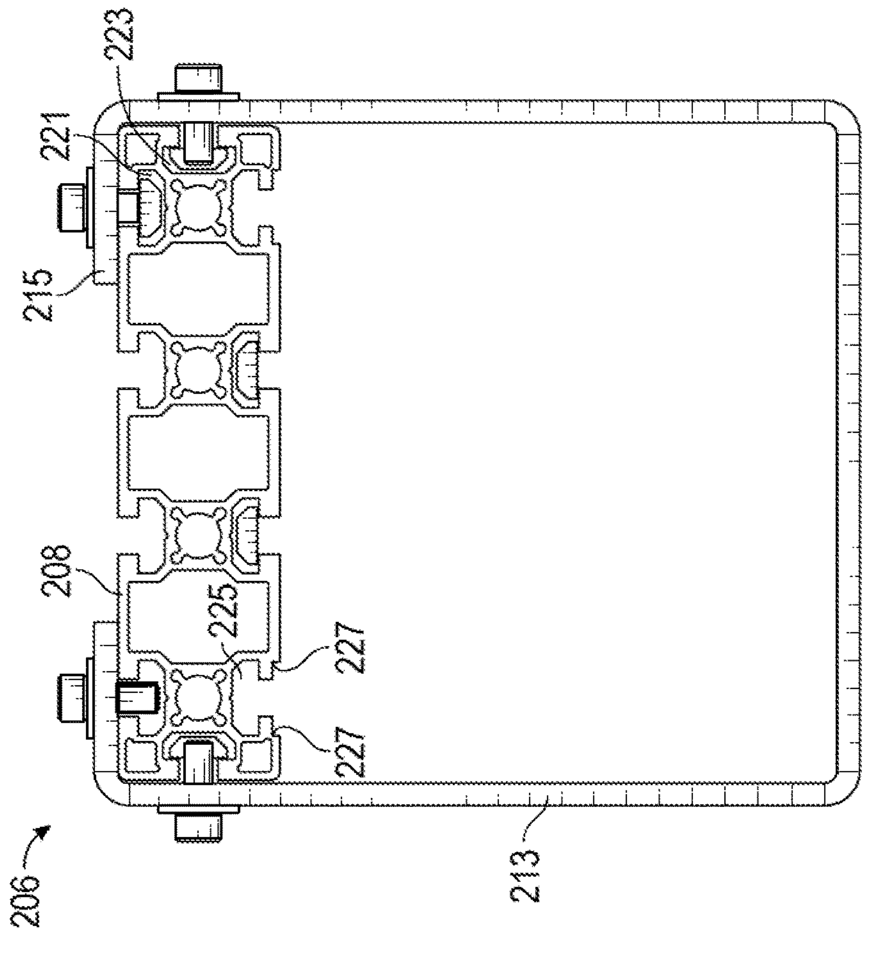
Figure 2K:
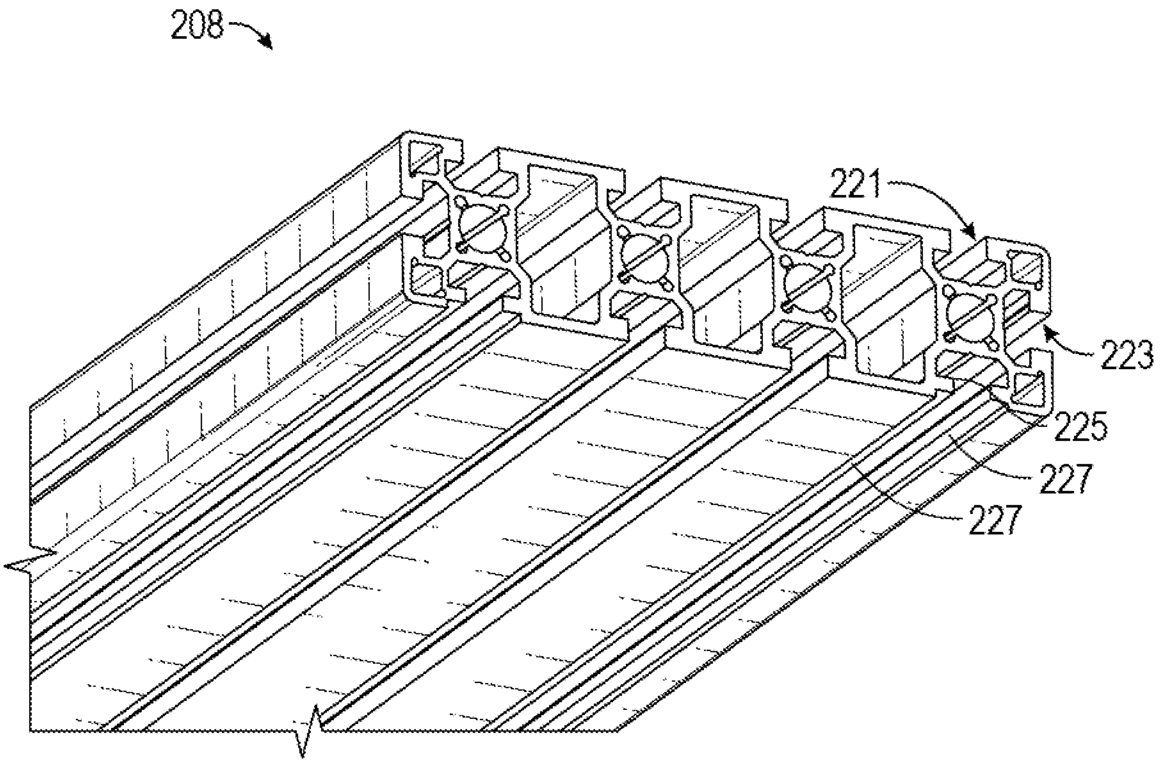
FIGS. 2K and 2L show an illustrative extension portion in accordance with the principles of the present disclosure.
Figure 2L:
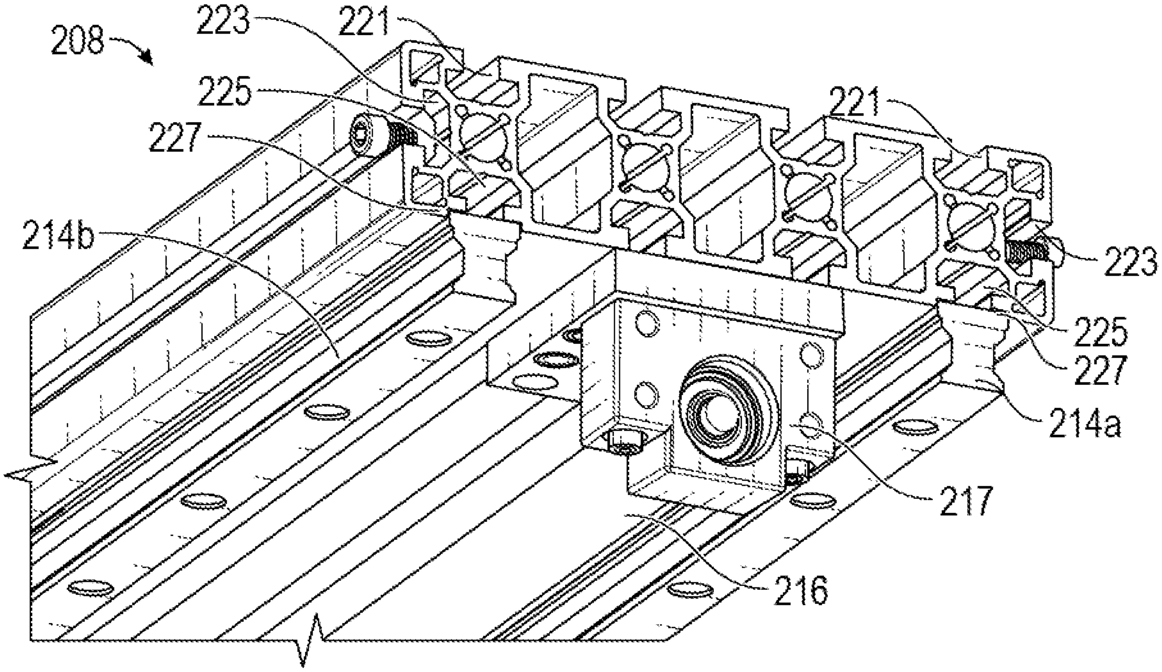
Figure 2M:
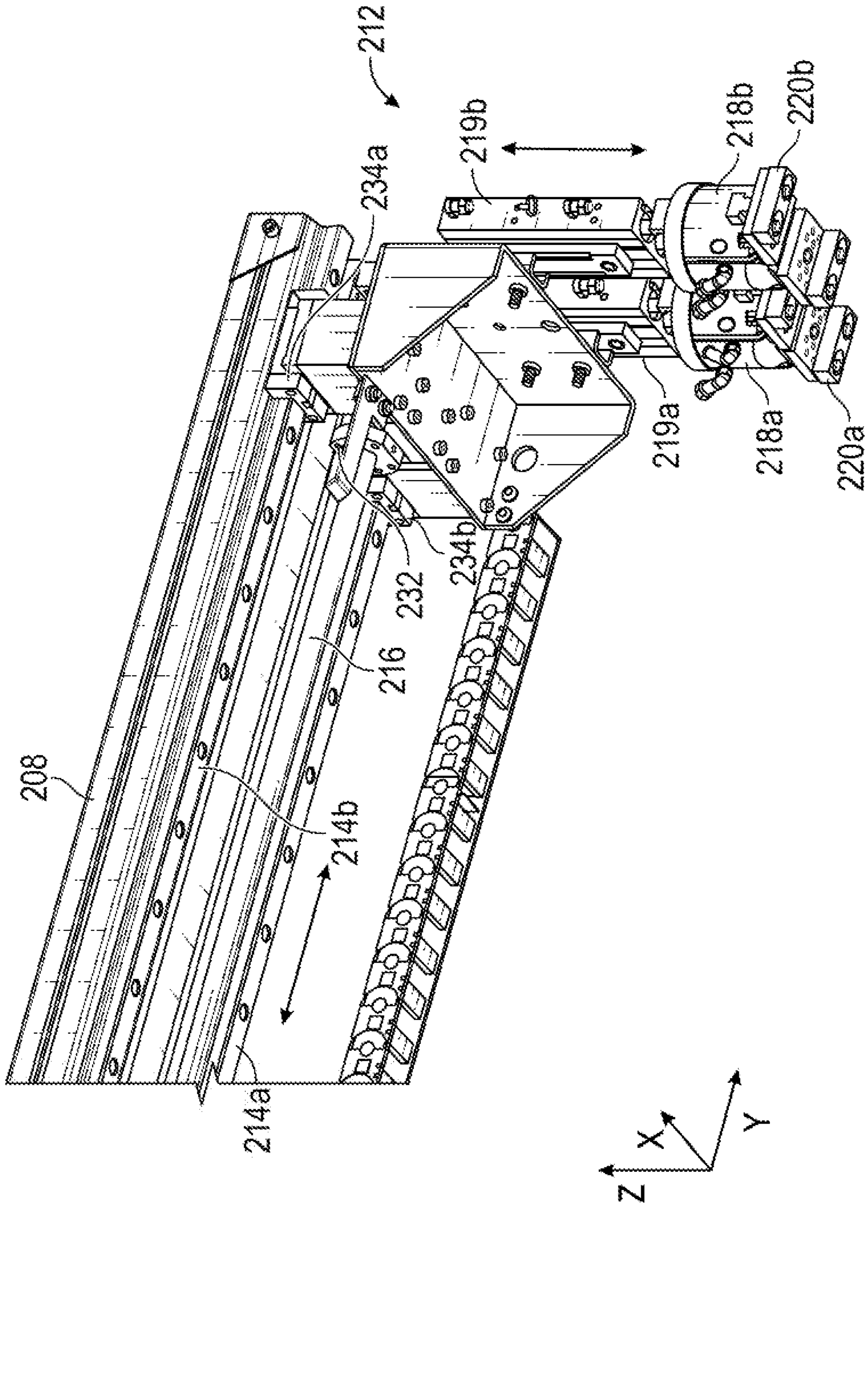
FIG. 2M shows an illustrative gripper assembly of the automated loader assembly of FIGS. 2A to 2C.
Figure 2O:
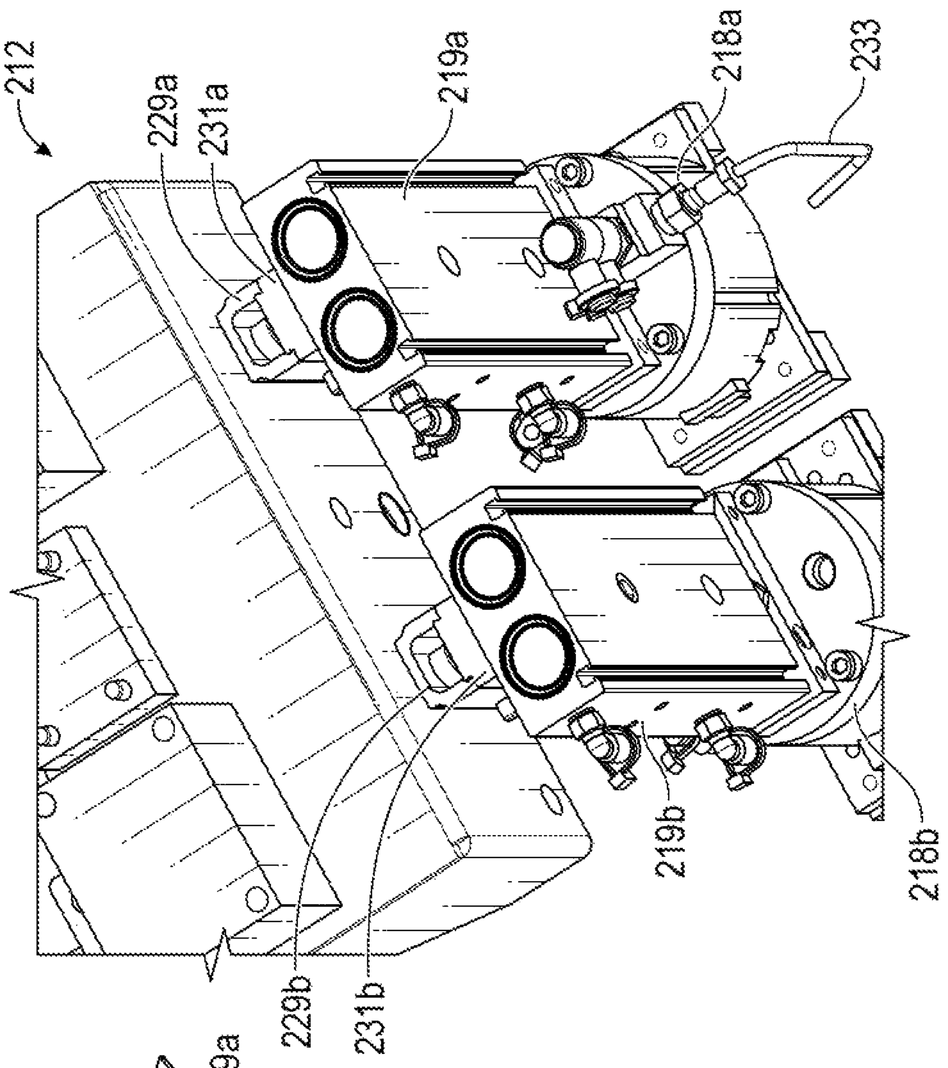
FIGS. 2N to 2P show an illustrative coupling mechanism of the gripper assembly in accordance with the principles of the present disclosure.
Figure 2N:
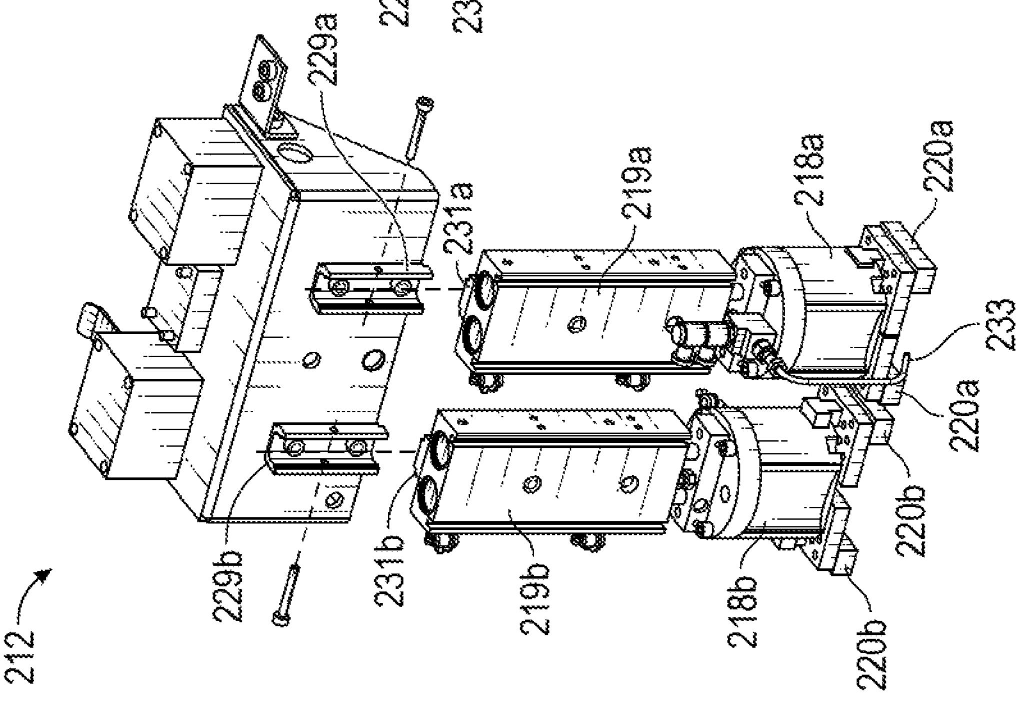
Figure 2Q:
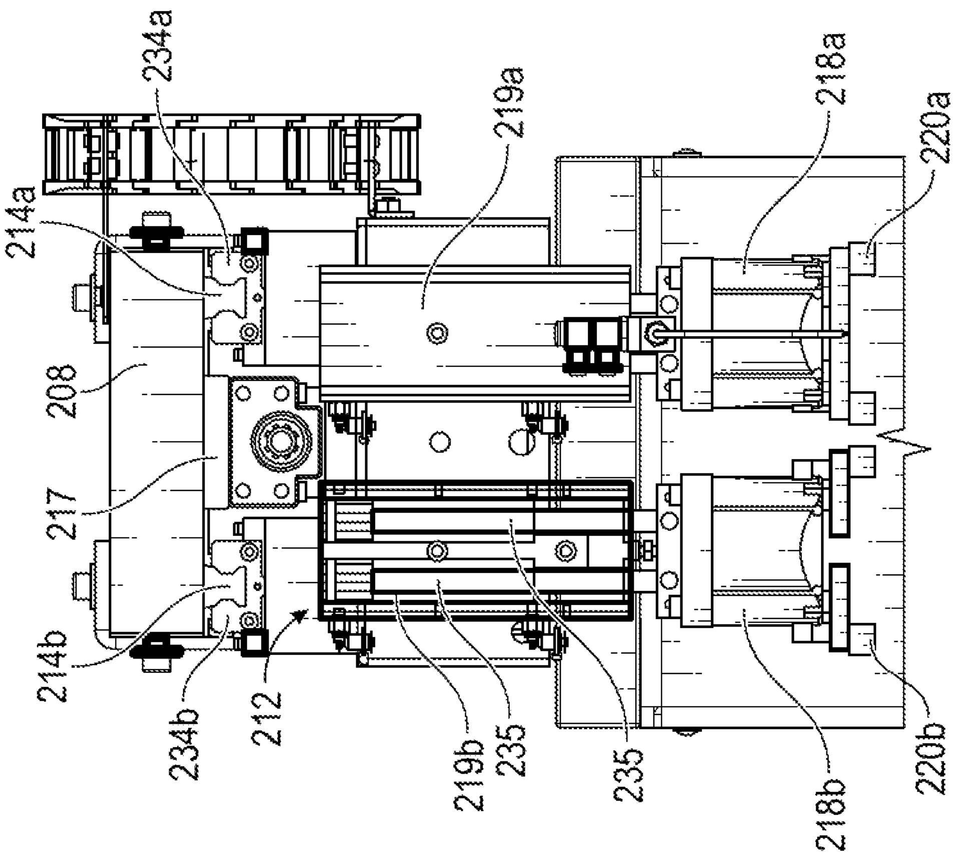
FIG. 2Q shows an illustrative dual shaft mechanism of the gripper assembly in accordance with the principles of the present disclosure.
Figure 2P:
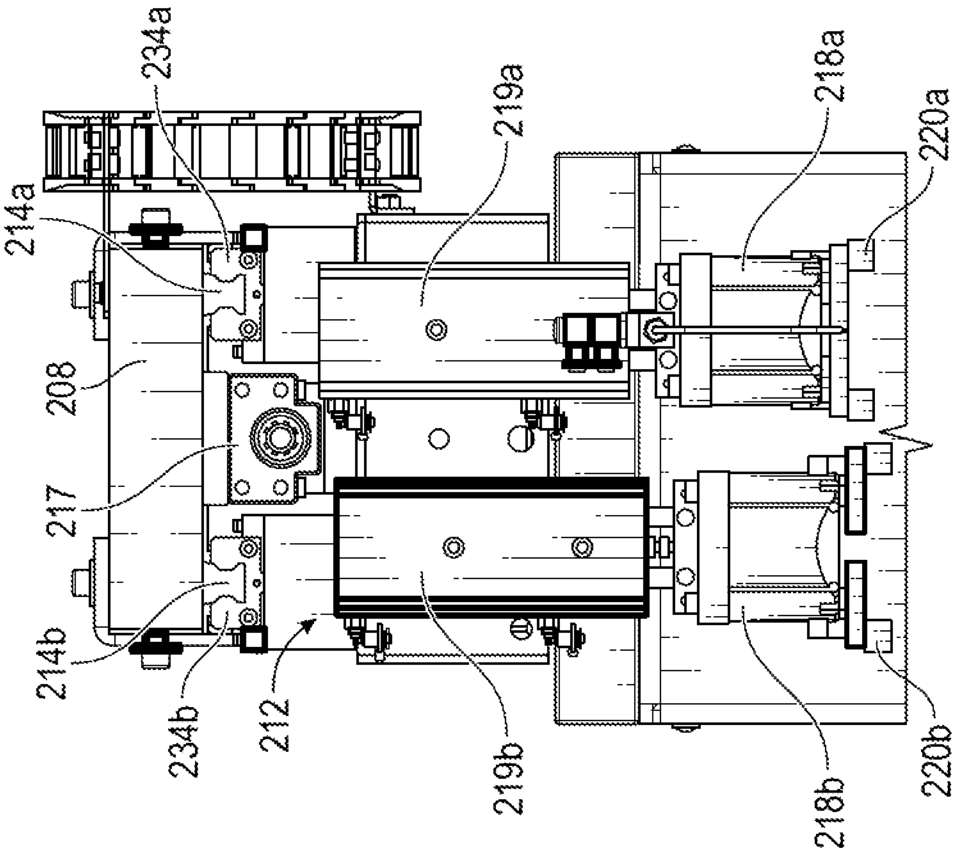
Figure 2R:
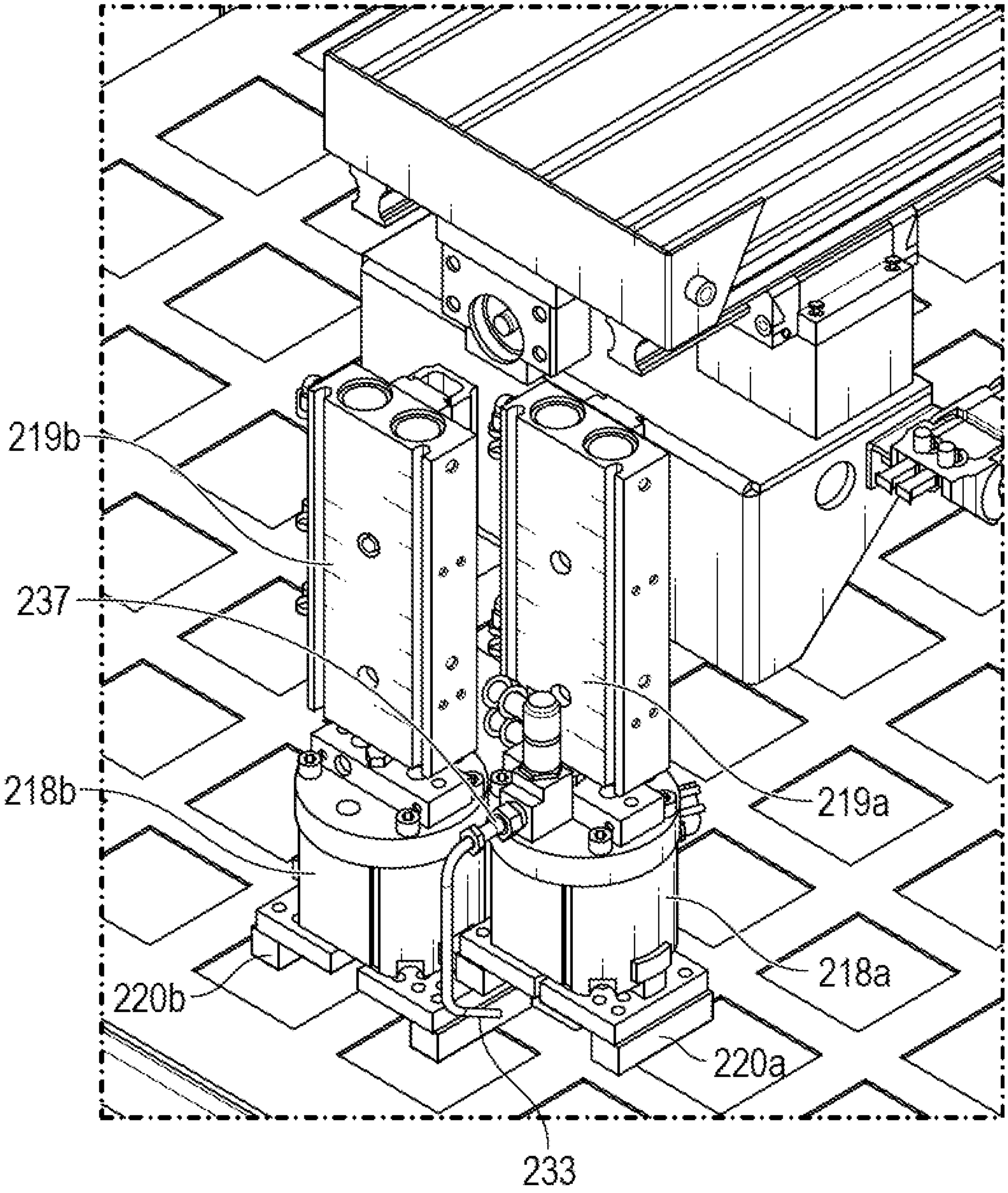
FIG. 2R shows an illustrative air blast of the gripper assembly.
Figure 2S:
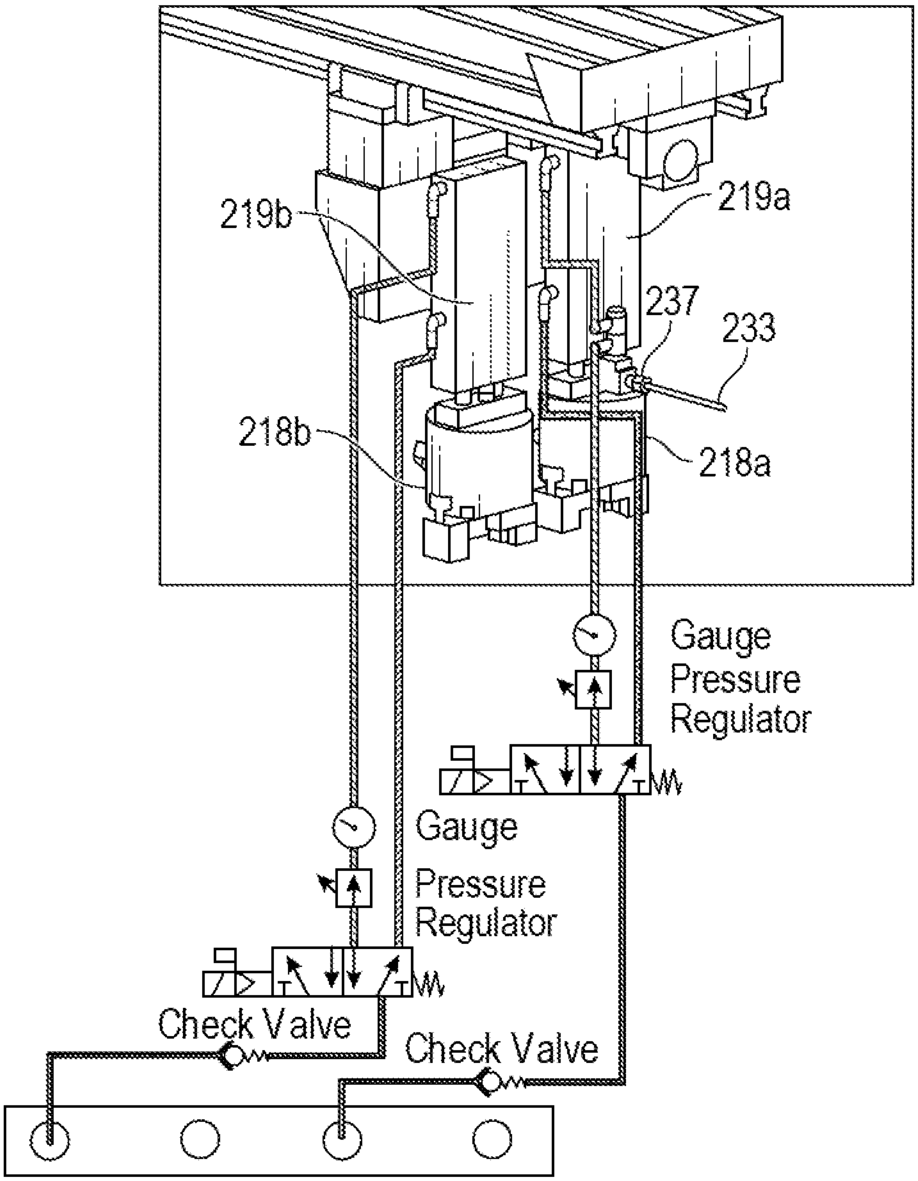
FIG. 2S is a schematic of the illustrative air blast.

Referring now to FIGS. 2A to 2S, an illustrative loader assembly is provided. As shown in FIGS. 2A to 2C, loader assembly 200 may include loading table 201 slidably coupled to loader arm 202. Loading table 201 may be made of sheet metal, and may include a plurality of legs. In some embodiments, loading table 201 may include a plurality of wheels coupled to the plurality of legs for movement of loader assembly 200 within a space. Accordingly, the loading table may include a brake mechanism for locking and unlocking the wheels to maintain a position of loading table 201 within the space, e.g., adjacent to machine 101. Alternatively, loading table 201 may not include wheels, and/or may be bolted to the floor.

Moreover, an upper surface of loading table 201 may include an array of product part holders 203, e.g., a 9×9 array of holders 203. Each holder 203 is sized and shaped to receive a single product part P (not shown), e.g., 2 inches by 2 inches for receiving an 8 cubic inch product part. Accordingly, a 9×9 array of holders 203 may receive 81 product parts P. As will be understood by a person having ordinary skill in the art, loading table 201 may have a different sized array of holders 203, e.g., 8×8, 8×9, 8×10, 9×10, 10×10, etc.

Figure 7:
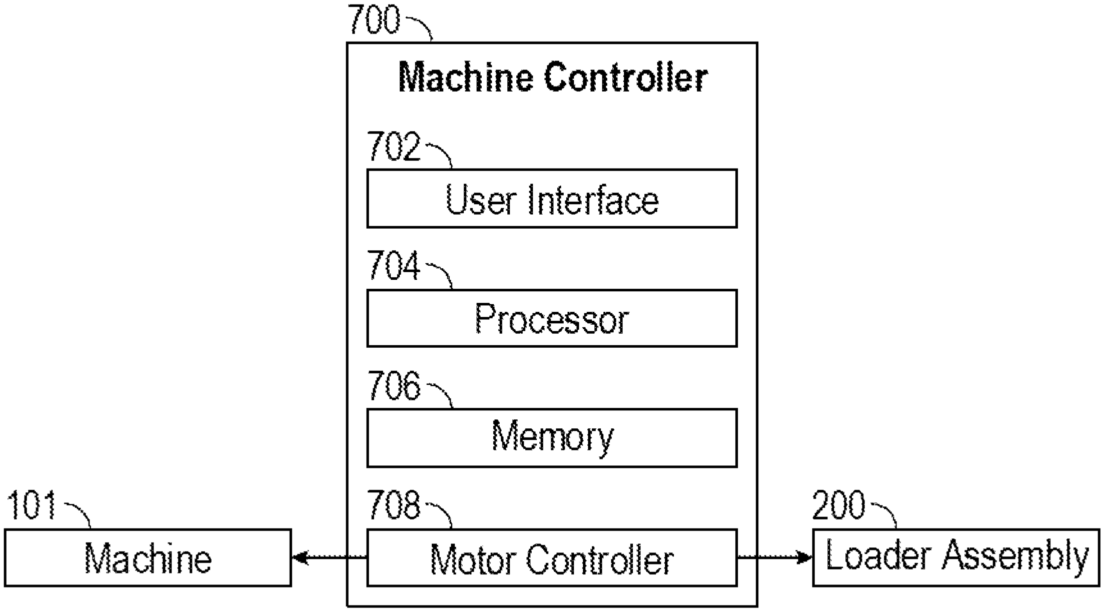
FIG. 7 is a schematic diagram of a machine controller system for a machine and an automatic parts loader in accordance with principles of the present disclosure.

Loader arm 202 may include sliding portion 204, rotatable portion 206, extension portion 208, and gripper assembly 212. Sliding portion 204 is configured to move linearly relative loading table 201, e.g., along the Y-axis toward and away from machine 101 when loader assembly 200 is in the desired position relative to machine 101. For example, as shown in FIGS. 2B, 2C, and 2D, sliding portion 204 may include one or more sliders, e.g., upper slider 224*a* and lower slider 224*b*, which are sized and shaped to slidably engage with one or more corresponding rails of loading table 201, e.g., upper rail 226*a* and lower rail 226*b*, extending linearly along a side of loading table 201 along the Y-axis and having precise and low friction surface for linear motion. Moreover, loading table 201 may include ball screw 228 extending along the side of loading table 201, parallel with rails 226*a*, 226*b*, and sliding portion 204 may include threaded slider 236 (FIG. 2D) having a threaded lumen sized and shaped to receive ball screw 228 therethrough. Ball screw 228 is axially fixed to loading table 201. Accordingly, upon actuation of ball screw 228, e.g., via motor 230 (FIG. 2B), sliding portion 204 may move linearly along rails 226*a*, 226*b* via sliders 224*a*, 224*b*, respectively, and along ball screw 228 via threaded slider 236. For example, motor 230 may be operatively coupled to the machine controller and programmed to cause rotation of ball screw 228 relative to threaded slider 236, which causes precise, low-friction linear movement of threaded slider 236 along ball screw 228 via the engagement of the threaded outer surface of ball screw 228 with the threaded inner surface of threaded slider 236. Motor 230 may be, for example, a low voltage servo motor controlled, for example, by the machine controller 700 (FIG. 7).

Rotatable portion 206 is configured to be rotatably coupled to sliding portion 204, e.g., via wheel bearing 210, such that rotatable portion 206 may rotate about an axis of rotation of loader arm 202, e.g., w-axis, relative to sliding portion 204. As shown in FIG. 2F, loader arm 202 may include motor 240, e.g., a DC servo motor disposed within sliding portion 204, which is operatively coupled to the machine controller 700 and to wheel bearing 210 and configured to precisely actuate wheel bearing 210, at a controlled speed, to thereby cause rotation of rotatable portion 206 relative to sliding portion 204. Preferably, motor 240 is programmed to cause rotation of rotatable portion 206 90 degrees between a first position where extension portion 208 extends along the X-axis, e.g., over table 201, and a second position where extension portion 208 extends along the Y-axis and is aligned with side door 104 of machine 101. Motor 240 may be selected to reliably provide just the sufficient torque and speed of rotation to wheel bearing 210 for operation, with minimal power requirements, and therefore, may be a low cost DC motor. Accordingly, motor 240 may operate at forces low enough such that rotation of wheel bearing 210 may be easily stopped, e.g., if extension portion 208 were to contact a person, thereby improving safety in the workspace.

As shown in FIG. 2G, loader arm 202 may include spring assembly 209, e.g., a gas spring mechanism, coupled to sliding portion 204 and rotatable portion 206. For example, a first end of spring assembly 209 may be coupled to sliding portion 204, and a second end of spring assembly 209 may be coupled to rotatable portion 206, e.g., lever 207 extending horizontally from rotatable portion 206. Lever 207 may have a triangular shape, such that the second end of spring assembly 209 may be coupled to an apex of lever 207. Accordingly, the compression spring force of spring assembly 209 may vary based on the rotational position of rotatable portion 206 relative to sliding portion 204, and may be selected to facilitate rotation of rotatable portion 206 and reduce voltage required by motor 240 to drive rotation of rotatable portion 206, as described in further detail below.

Figure 3A:
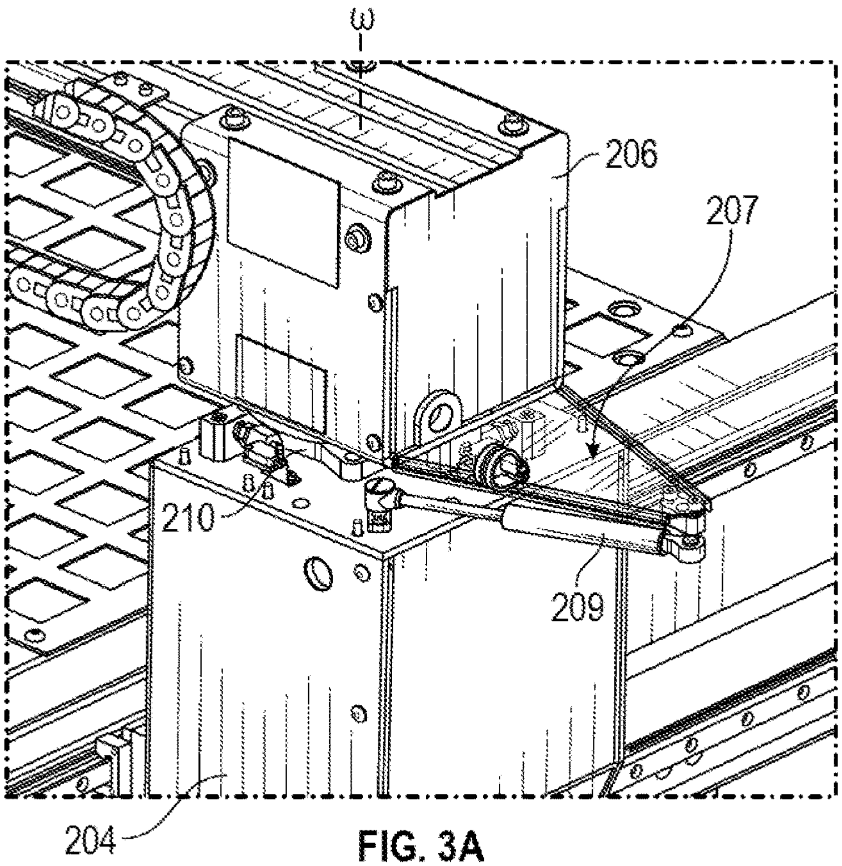
FIGS. 3A to 3D illustrate rotation of the loader arm in accordance with the principles of the present disclosure.
Figure 3B:
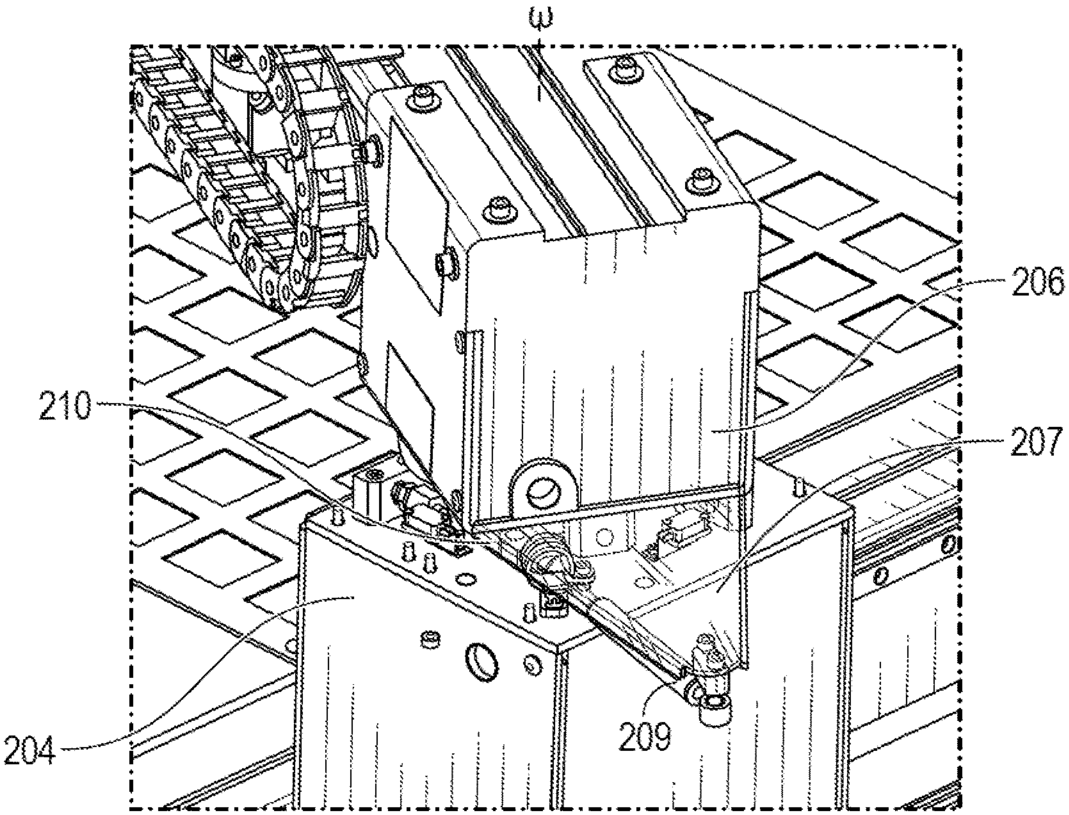
Figure 3C:
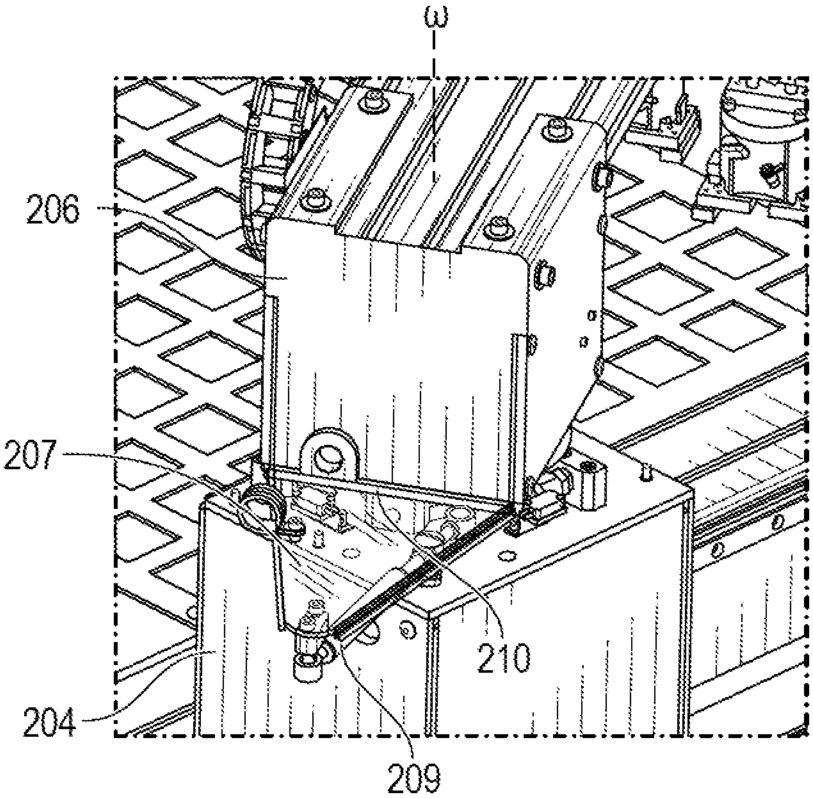
Figure 3D:
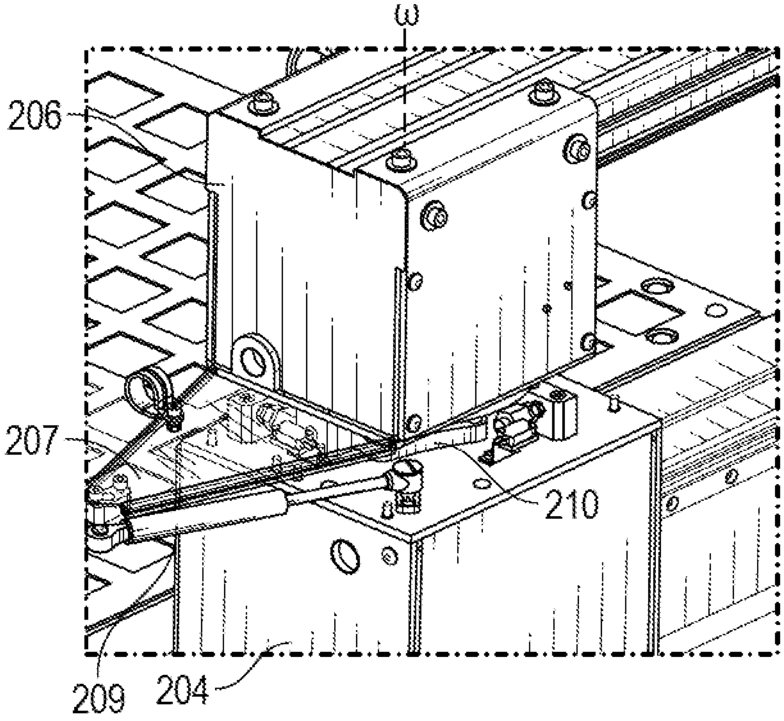
Figure 4A:
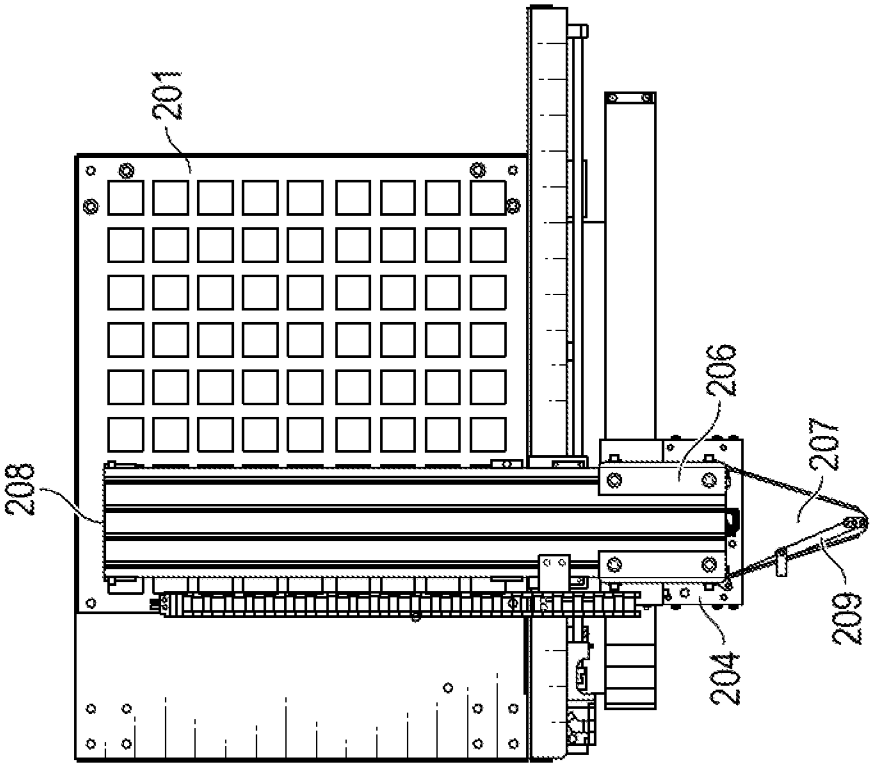
FIGS. 4A to 4E is a top view of the rotation of the loader arm in accordance with the principles of the present disclosure.
Figure 4B:
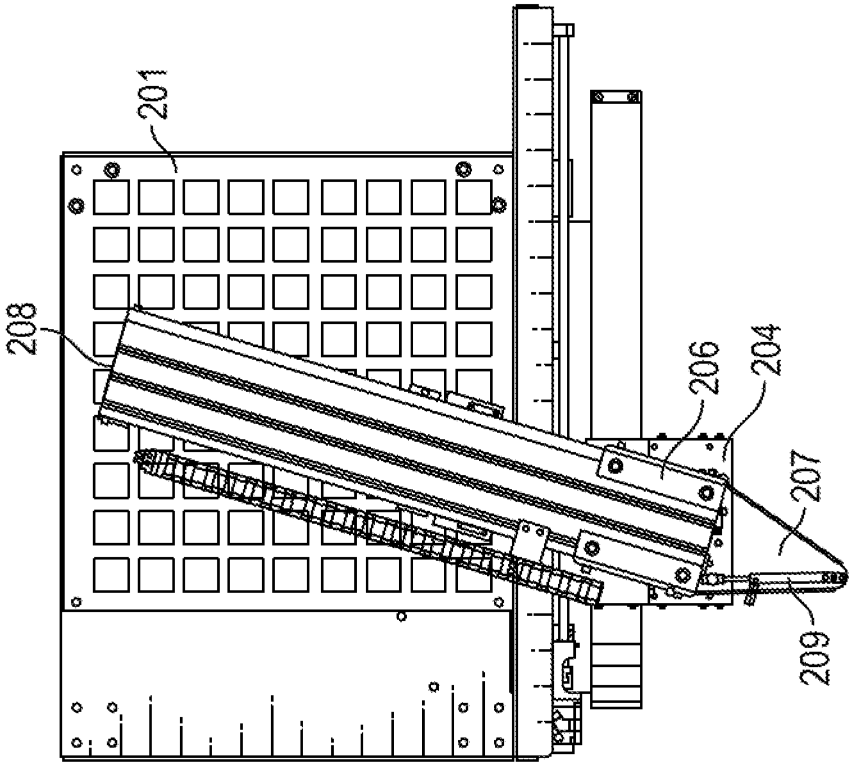
Figure 4C:
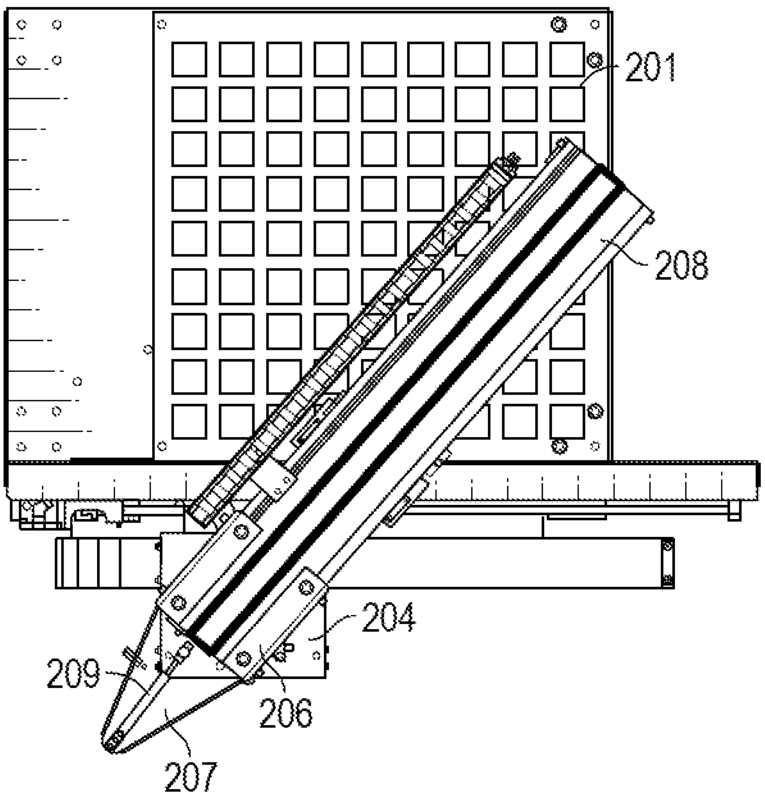
Figure 4D:
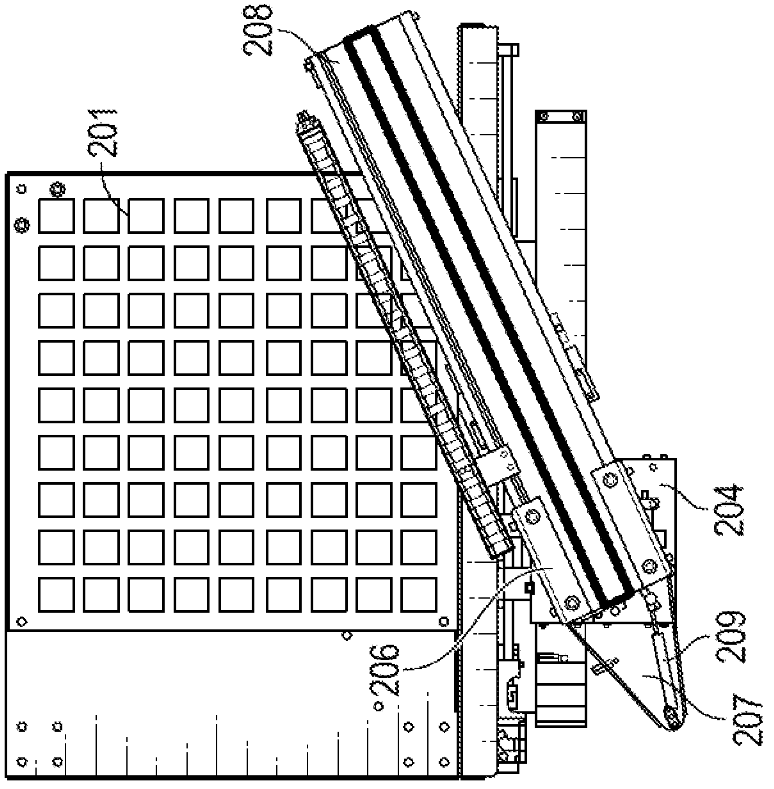
Figure 4E:
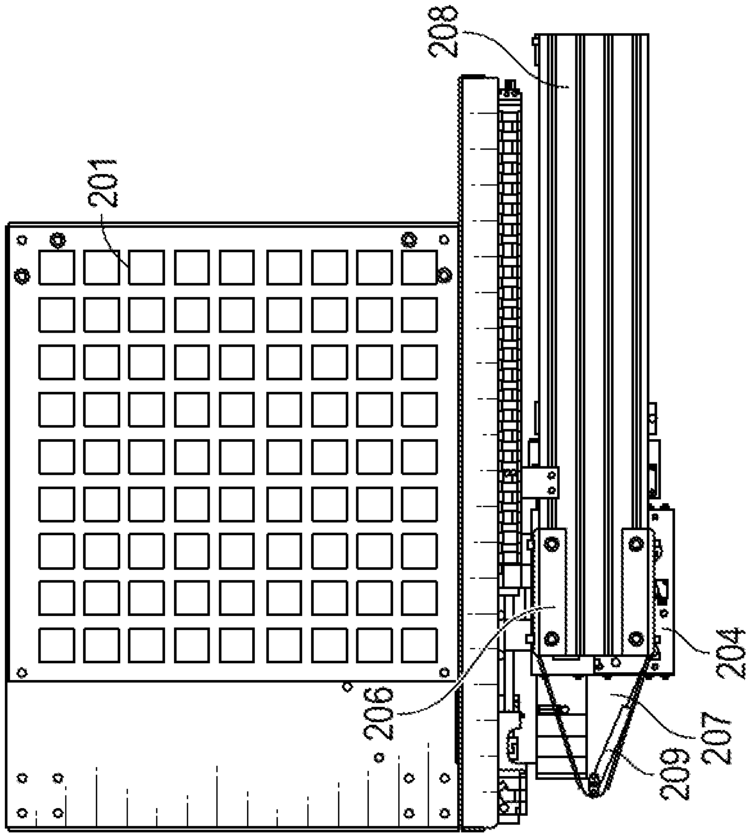

As shown in more detail in FIGS. 3A to 3D and 4A to 4E, the first end of spring assembly 209 may be coupled to sliding portion 204 at a position offset from the center of rotation of rotatable portion 206, e.g., w-axis. For example, the distance between the first and second ends of spring assembly 209 may be at a maximum when rotatable portion 206 is in the first and second positions, as shown in FIGS. 3A, 3D, 4A and 4E, and may be at a minimum when rotatable portion 206 is halfway between the first and second positions, as shown in FIGS. 3C and 4C. FIGS. 4A to 4E are top views of loader assembly 202 as rotatable portion 206 rotates from the first position, as shown in FIG. 4A, to the second position, as shown in FIG. 4E. Accordingly, spring assembly 209 may have a maximum compression spring force when rotatable portion 209 is rotated halfway between the first and second positions, as shown in FIG. 4C.

Moreover, spring assembly 209 may be configured such that spring assembly 209 has a non-zero compression spring force when rotatable portion 206 is in the first and second positions, such that the compression spring force at the first and second positions exerts additional torque on rotatable portion 206 to maintain and stabilize rotatable portion 206, and accordingly, extension portion 208, at the first and second positions, and thus making the recovery process easier, e.g., in case of power loss. For example, in the first and second positions, spring assembly 209 may remain 90-95% extended (5-10% compressed), whereas spring assembly 209 may achieve maximum compression, e.g., 100% compressed, at the halfway point between the first and second positions.

In addition, spring assembly 209 may be configured to dampen motion of rotatable portion 206 as rotatable portion 206 rotates between the first and second positions, to thereby reduce or eliminate bounce of rotatable portion 206, and accordingly, extension portion 208, as rotatable portion 206 reaches the first and second positions, which allows overall faster and smoother rotation of rotatable portion 206 driven by motor 240. For example, as rotatable portion 206 reaches the halfway point between the first and second positions, the compression spring force of spring assembly 209 may facilitate rotation of rotatable portion 206 beyond the halfway point, while spring assembly 209 dampens motion of rotatable portion 206 to thereby limit the speed and momentum of rotatable portion 206 in a controlled manner, which in excess may cause the bounce effect as rotatable portion 206 reaches the first and second positions. As will be understood by a person having ordinary skill in the art, the parameters of spring assembly 209 are selected to work with motor 240, rotatable portion 206, and extension portion 208, such that spring assembly 209 may provide sufficient compression spring force and dampening to thereby eliminate bounce, while providing sufficient torque at the first and second positions.

Moreover, the compression spring force of spring assembly 209 may be sufficient to drive rotation of rotatable portion 206 beyond the halfway point to the final position, e.g., the first or second position, with reduced or zero assistance from motor 240. For example, as shown in FIG. 2H, loader arm 202 may include switch 205 operatively coupled to motor 240, and trigger 211, e.g., a shoulder bolt, configured to engage with switch 205 when rotatable portion 206 is at or slightly past the halfway point between the first and second positions, such that engagement of switch 205 by the trigger 211 causes a signal to be sent to motor 240 by switch 205 that triggers a voltage drop of motor 240. Accordingly, upon receipt of the signal, the machine controller may cause a voltage drop of motor 240, such that rotation of rotatable portion 206 may be completed primarily or completely by spring assembly 209. As shown in FIG. 2H, switch 205 may be positioned on sliding portion 204, whereas trigger 211 may be positioned on rotatable portion 206, such that trigger 211 rotates along with rotatable portion 206 and contacts switch 205 when rotatable portion 206 is at the halfway point between the first and second positions. Alternatively, as will be understood by a person having ordinary skill in the art, switch 205 may be positioned on rotatable portion 206 and trigger 211 may be positioned on sliding portion 204.

As shown in FIGS. 2I and 2J, rotatable portion 206 may include mount 213 having flanges 215 and configured to be mounted to a proximal region of extension portion 208 to stabilize and maintain extension portion 208 in a position parallel to table 201. For example, as shown in FIGS. 2I and 2J, extension portion 208 may be formed of a beam having a plurality of predefined upper grooves 221 extending along a length of the upper surface of the beam, a plurality of predefined lower grooves 225 extending along a length of the lower surface of the beam, and one or more predefined side grooves extending along a length of each side of the beam. The predefined grooves may be sized and shaped to receive a coupling mechanism, e.g., screw/washer, for securing mount 213 and flanges 215 to the beam. For example, the sides of mount 213 may be mounted to the beam via side grooves 223, and flanges 215 of mount 213 may be mounted to the upper surface of the beam via upper grooves 221.

Figure 5:
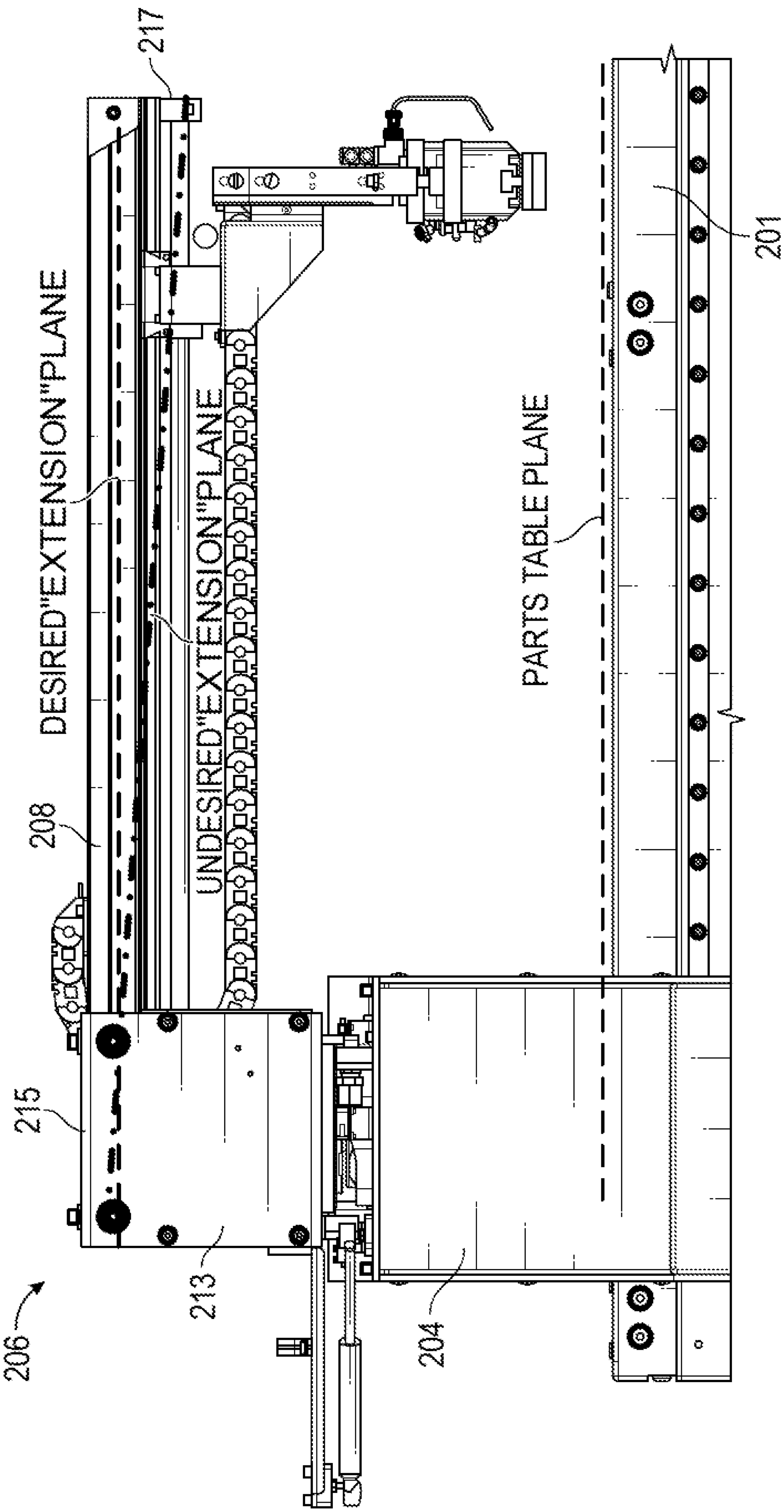
FIG. 5 illustrates desired extension of the extension portion of the loader arm.

For example, as shown in FIG. 5, extension portion 208 may extend between mount 213 and end cap 217, such that desired extension plane of extension portion 208 is parallel to the plane of the upper surface of table 201. By mounting mount 213 and flanges 215 to both the side and upper surface of the beam of extension portion 208, and along one or more lateral positions along the length of the beam, mount 213 may maintain the desired position and alignment of the plane of extension portion 208 relative to the plane of table 201, e.g., parallel to table 201, over time, as shown in FIG. 5. As shown in FIG. 5, without flanges 215 of mount 213 for coupling extension portion 208 to rotatable portion 206, over time, the plane of extension portion 208 may deviate from the desired extension plane towards an undesired extension plane of extension portion 208, which is not parallel to the plane of the upper surface of table 201. Accordingly, coupling extension portion 208 to mount 213 via flanges 215 may prevent the planes of extension portion 208 and table 201 from falling out of alignment during operation of loader assembly 200. By utilizing innate grooves of the beam for fastening components to the beam, the cost and complexity of loader arm 202 may be reduced.

Referring now to FIGS. 2I to 2L, at least some grooves of lower grooves 225 may include predefined slots 227 extending along the length of the respective grooves. Predefined slots 227 may be sized and shaped to facilitate auto-alignment of rail 214*a* and rail 214*b* relative to extension portion 208 for facilitating linear movement of gripper assembly 212 along extension portion 208, as described in further detail below. For example, as shown in FIG. 2L, slots 227 may have a width equal to the width of the portion of rail 214*a* to be coupled thereto, such that rail 214*a* may be inserted into slots 227 without requiring manual alignment thereof. The beam may be machined to include predefined slots 227, or alternatively, predefined slots 227 may be innate to the beam, e.g., created during manufacture of the beam. Accordingly, rails 214*a*, 214*b* may be affixed to lower grooves 225 via a screw/washer assembly inserted through a plurality of predefined threaded openings extending through rails 214*a*, 214*b*, sized and shaped to receive the screws therethrough, as shown in FIG. 2L.

As shown in FIG. 2D and FIGS. 2M to 2S, gripper assembly 212 may include a pair of grippers, e.g., gripper 218*a* and gripper 218*b*, configured to be actuated to move linearly, e.g., up and down along the Z-axis, relative to extension portion 208. For example, each of grippers 218*a*, 218*b* may include a respective actuation system, e.g., pneumatic pistons/cylinders 219*a*, 219*b*, configured to actuate linear movement of grippers 218*a*, 218*a*. As will be understood by a person having ordinary skill in the art, other actuation systems may be used to linearly move grippers 218*a*, 218*b*, such as hydraulic pistons. Pneumatic pistons 219*a*, 219*b* may be actuated via one or more motors, e.g., solenoid 222 (FIG. 2A), which may be operatively coupled to the machine controller and require minimal machine outputs.

As shown in FIGS. 2N and 2O, each of pneumatic pistons 219*a*, 219*b* may be coupled to gripper assembly 212 via parallel, vertically extending rails 229*a*, 229*b*. For example, the respective cylinders of pneumatic pistons 219*a*, 219*b* may each include a dovetail mount, e.g., dovetail mounts 231*a*, 231*b*, extending vertically along a length of the respective cylinder and sized and shaped to be received by rails 229*a*, 229*b*, respectively. Accordingly, pneumatic pistons 219*a*, 219*b* may be maintained parallel to each other and perpendicular to the axis of linear movement of grippers 218*a*, 218*b* relative to pneumatic pistons 219*a*, 219*b*, and positioned a set distance apart, as shown in FIG. 2P. The dovetail shape of mounts 231*a*, 231*b* and the corresponding geometry of rails 229*a*, 229*b* may facilitate auto-alignment of mounts 231*a*, 231*b* with rails 229*a*, 229*b*, respectively, which will reduce manufacturing and assembly time. As shown in FIG. 2Q, each cylinder of pneumatic pistons 219*a*, 219*b* may include dual piston rods 235 for actuating grippers 218*a*, 218*b*, respectively, such that rotation of grippers 218*a*, 218*b* relative to pneumatic pistons 219*a*, 219*b* may be minimized to, e.g., ±0.5 degrees.

In addition, each of grippers 218*a*, 218*b* may include one or more retractable gripper arms, e.g., gripper arms 220*a*, 220*b*, respectively, configured to grab/clamp and release product part P. For example, each of gripper arms 220*a*, 220*b* may include a pair of retractable tabs configured to be actuated, e.g., via an actuation system integrated with gripper assembly 212 and operatively coupled to the machine controller 700, to move toward each other to grab product part P, and to move away from each other to release product part P, with optimal grip force to weight ratio. Moreover, the pair of retractable tabs of each gripper arms 220*a*, 220*b* may be spaced apart such that they may grab and release a product part of up to, e.g., 8 cubic inches. In addition, the gripping force of gripper arms 220*a*, 220*b* may be sufficient to hold a product part of up to, e.g., 3 lbs. As described above, the components of gripper assembly 212 may be scalable bigger or smaller to accommodate different size/weight product parts, while requiring minimal power for actuation thereof, as well as minimal torque for rotating rotatable portion 206 while gripper assembly 212 holds one or more product parts.

As shown in FIG. 2M, gripper assembly 212 may be configured to move linearly relative to extension portion 208, e.g., along the Y-axis within machine 101 for aligning gripper assembly 212 with the product parts within machine 101, and along the X-axis to access different rows of the array of holders 203 of table 201 for loading and unloading of product parts P. For example, as shown in FIG. 2M, gripper assembly 212 may include one or more sliders, e.g., slider 234*a* and slider 234*b*, which are sized and shaped to slidably engage with one or more corresponding rails of extension portion 208, e.g., rail 214*a* and rail 214*b*, extending linearly along the length of extension portion 208 and having precise and low friction surface for linear motion. As described above, rails 214*a*, 214*b* may auto-align with slots 227 of lower grooves 225 of extension portion 208, and coupled thereto.

Moreover, extension portion 208 may include ball screw 216 extending along the length of extension portion 208, parallel with rails 214*a*, 214*b*, and gripper assembly 212 may include threaded slider 232 having a threaded lumen sized and shaped to receive ball screw 216 therethrough. Ball screw 216 may be axially fixed to extension portion 208. For example, a proximal end of ball screw 216 may be axially fixed at the proximal region of extension portion 208, e.g., within mount 213 of rotatable portion 206, and a distal end of ball screw 216 may be axially fixed to end cap 217 (FIGS. 2P and 2Q) at the distal region of extension portion 208. Accordingly, upon actuation of ball screw 216, e.g., via motor 238 (FIG. 2E), gripper portion 212 may move linearly along rails 214*a*, 214*b* via sliders 234*a*, 234*b*, respectively, and along ball screw 216 via threaded slider 232. For example, motor 238 may be operatively coupled to the machine controller 700 and programmed to cause rotation of ball screw 216 relative to threaded slider 232, which causes precise, low-friction linear movement of threaded slider 232 along ball screw 216 via the engagement of the threaded outer surface of ball screw 216 with the threaded inner surface of threaded slider 232. Motor 238 may be, for example, a low voltage servo motor.

As shown in FIG. 2R, gripper assembly 212 further may include air blast tube 233 having a first end having an inlet fluidicly coupled to extension port 237 of the cylinder of, e.g., pneumatic piston 219*a*, and a second end having an outlet in the vicinity of, e.g., gripper arms 220*a*. FIG. 2S illustrates the air flow path through gripper assembly 212. As shown in FIG. 2S, air of pneumatic piston 219*a* is joined with air blast tube 233 via extension port 237 prior to entering the cylinder, such that at least some air may be redirected through air blast tube 233. Accordingly, during downward movement of gripper 218*a* via pneumatic piston 219*a*, air blast tube 233 may redirect at least some air from the cylinder of pneumatic piston 219*a* towards the outlet of air blast tube 233 to thereby apply a stream of air in the vicinity of gripper arms 220*a*, e.g., towards a finished product part to be picked up by gripper arms 220*a*. The applied air may be sufficient to blow away debris to thereby clean off the finished product part prior to pick up by gripper arms 220*a*. In addition, as the air is redirected from the cylinder of pneumatic piston 219*a*, the force applied to the finished product part by gripper 218*a* as grippers 218*a* is lowered down towards the finished product part may be reduced, and the need for an additional solenoid eliminated.

Figure 6A:
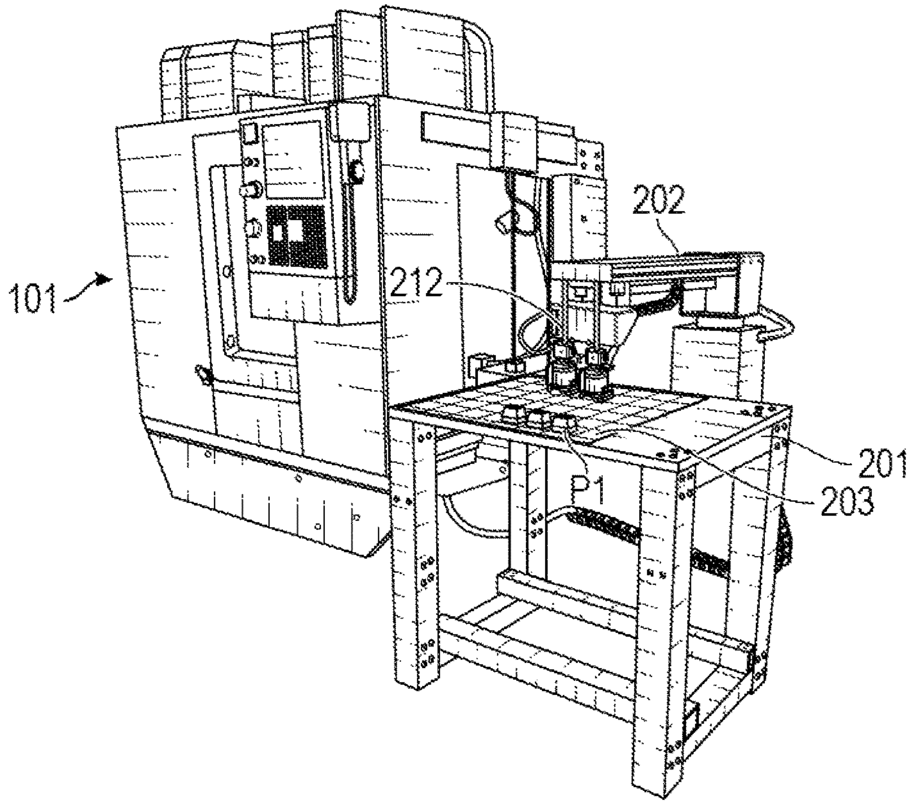
FIGS. 6A to 6S shows illustrative steps for loading and unloading product parts using the automated system of FIGS. 1A and 1B.
Figure 6B:
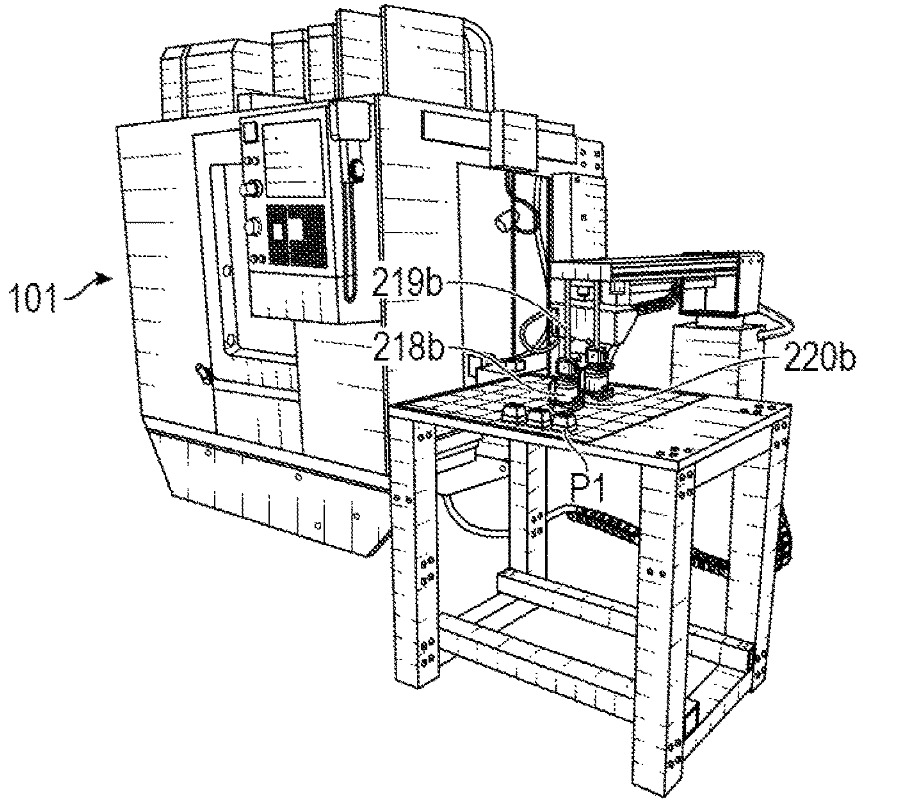
Figure 6C:
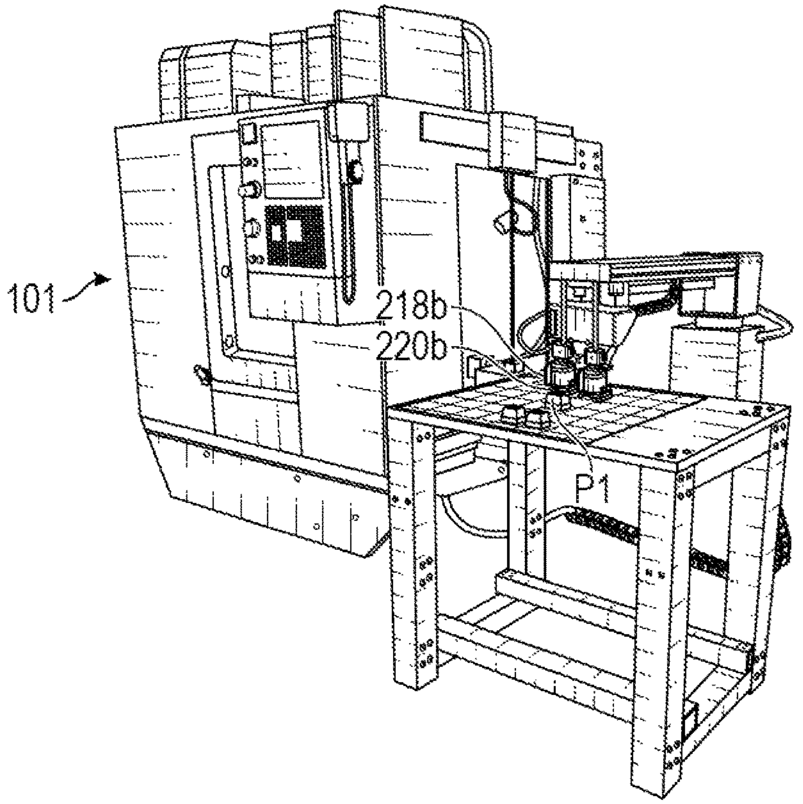
Figure 6D:
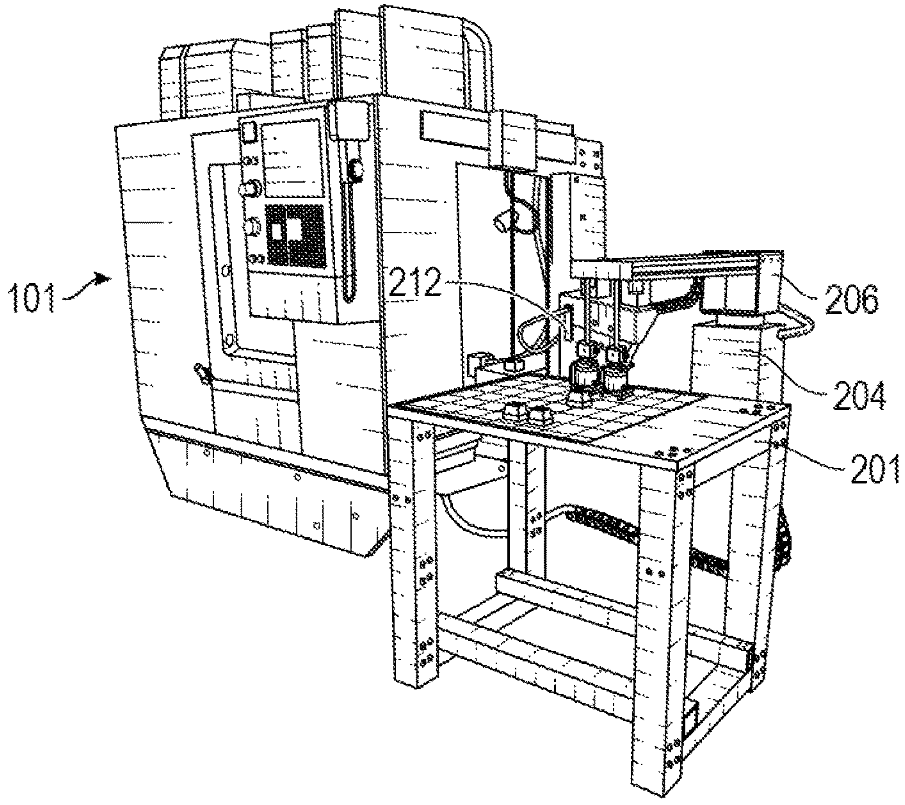
Figure 6E:
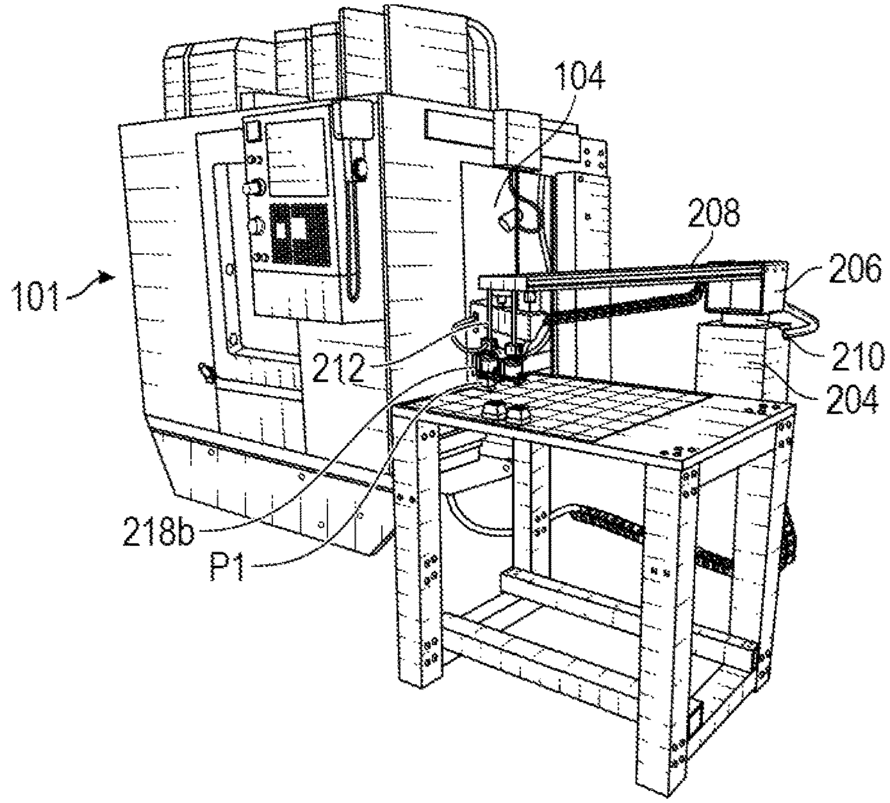
Figure 6F:
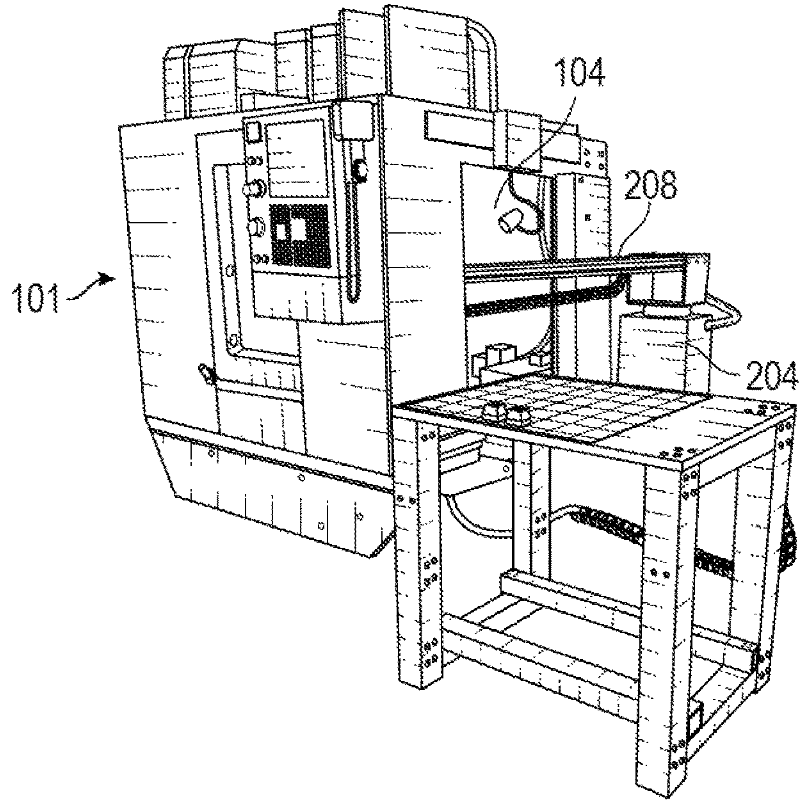
Figure 6G:
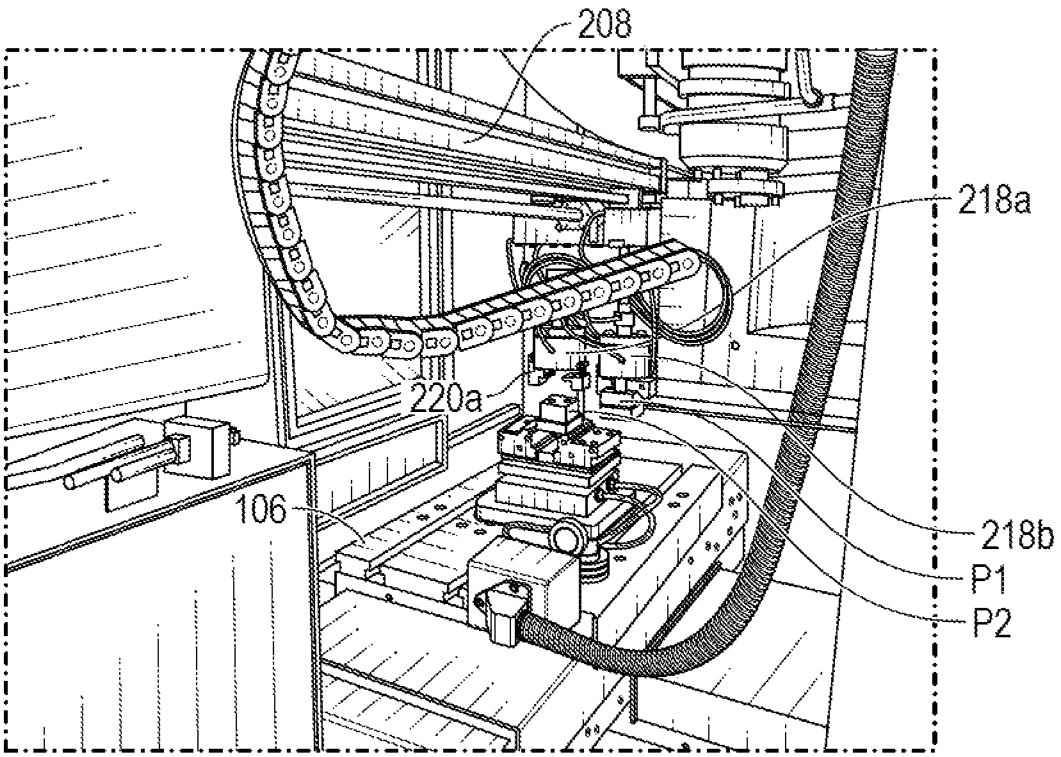
Figure 6H:
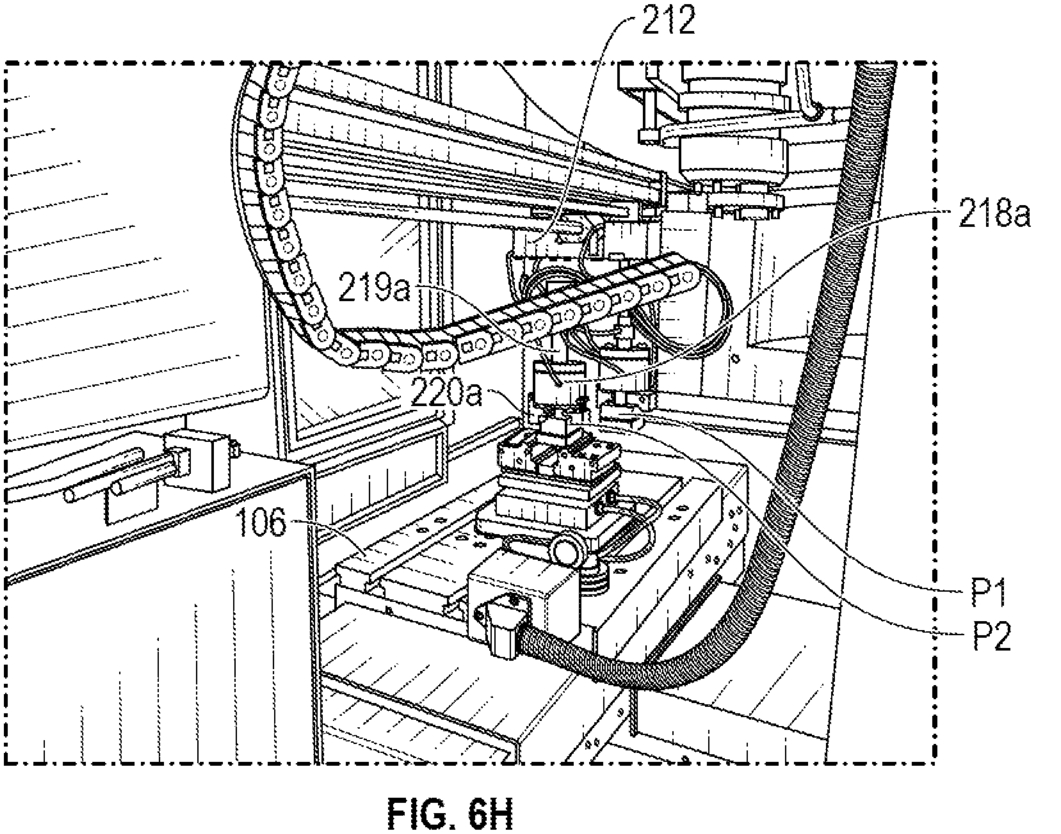
Figure 6I:
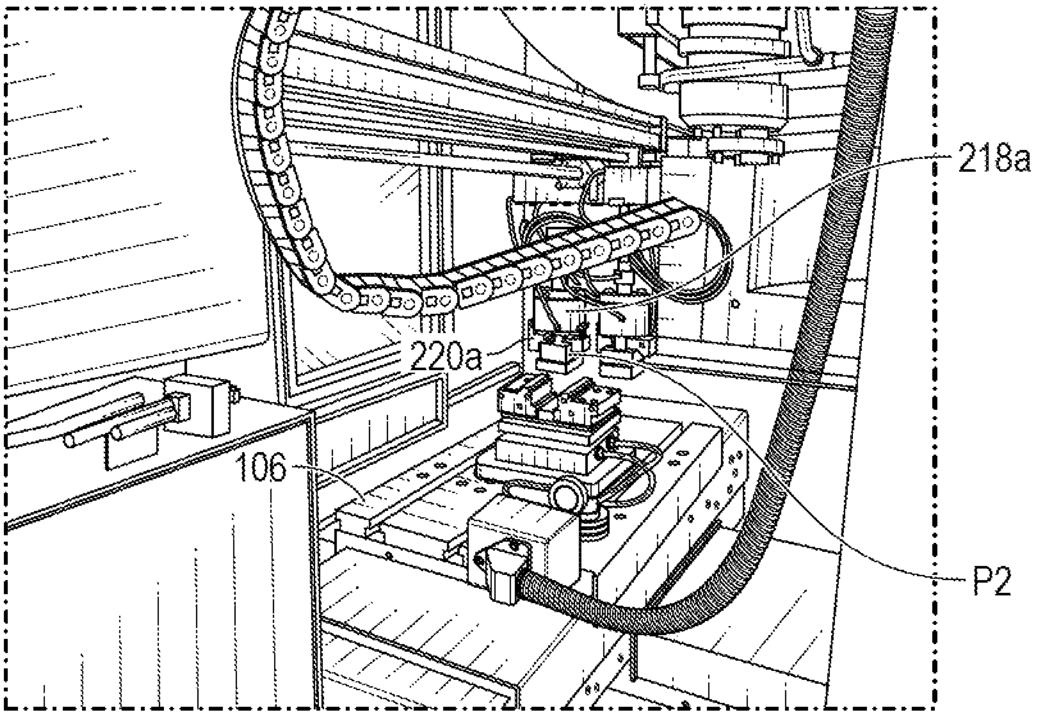
Figure 6J:
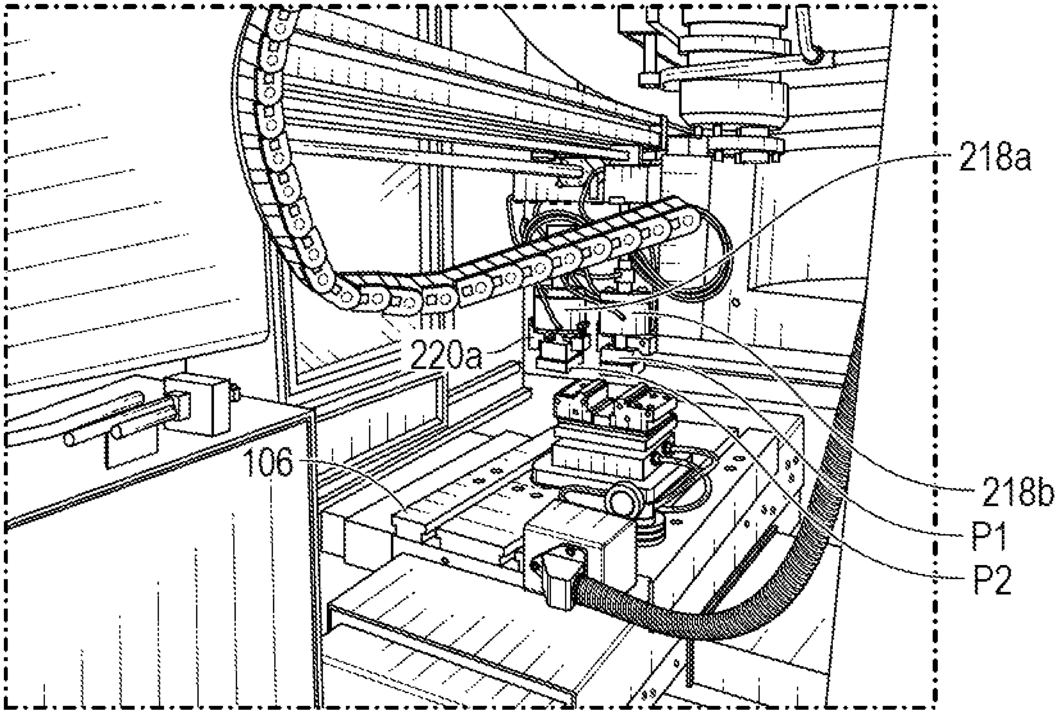
Figure 6K:
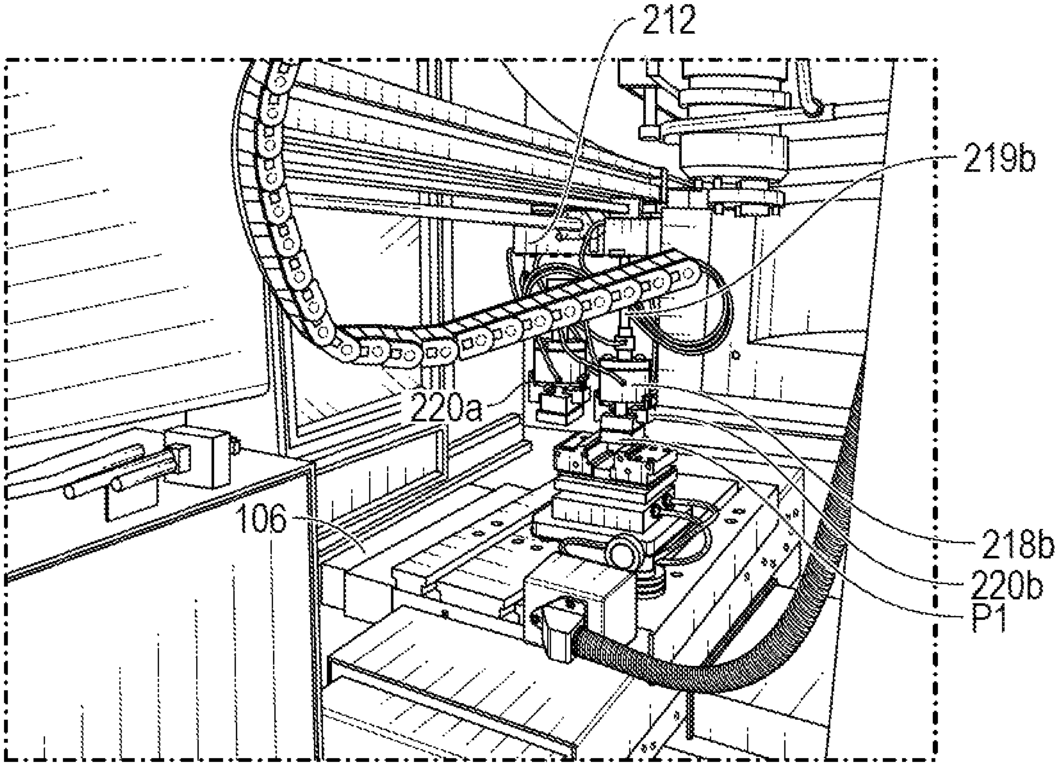
Figure 6L:
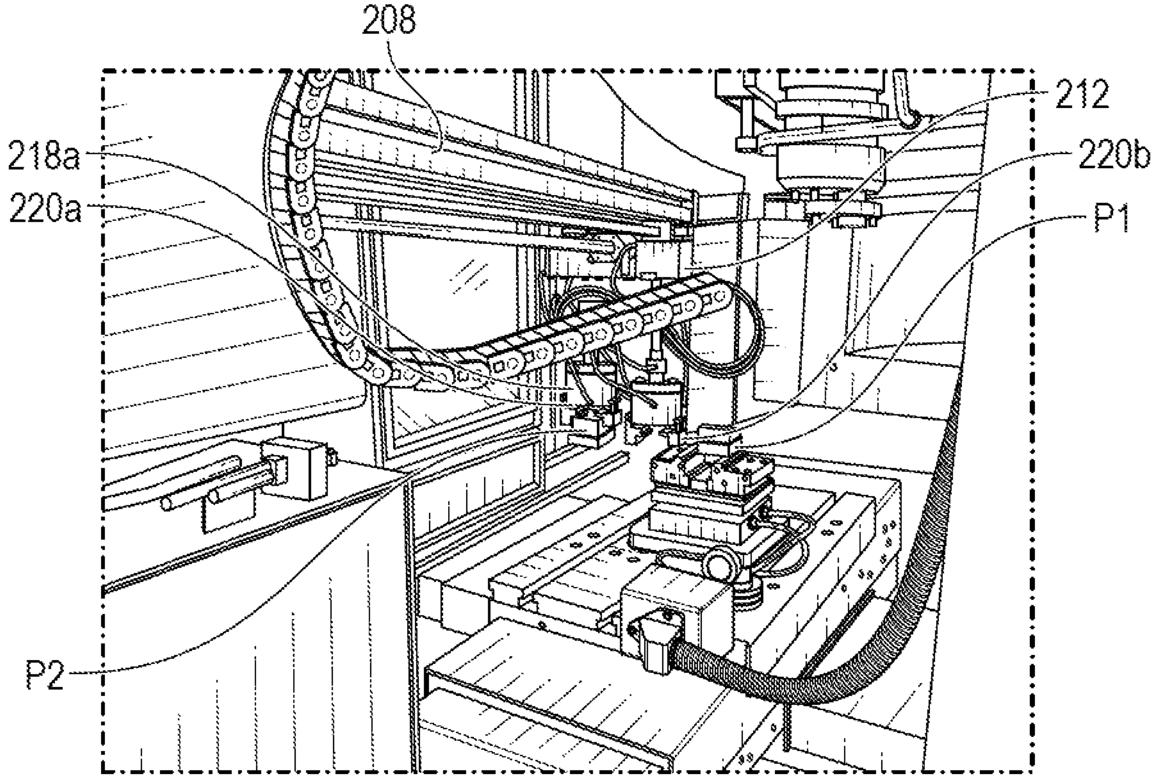
Figure 6M:
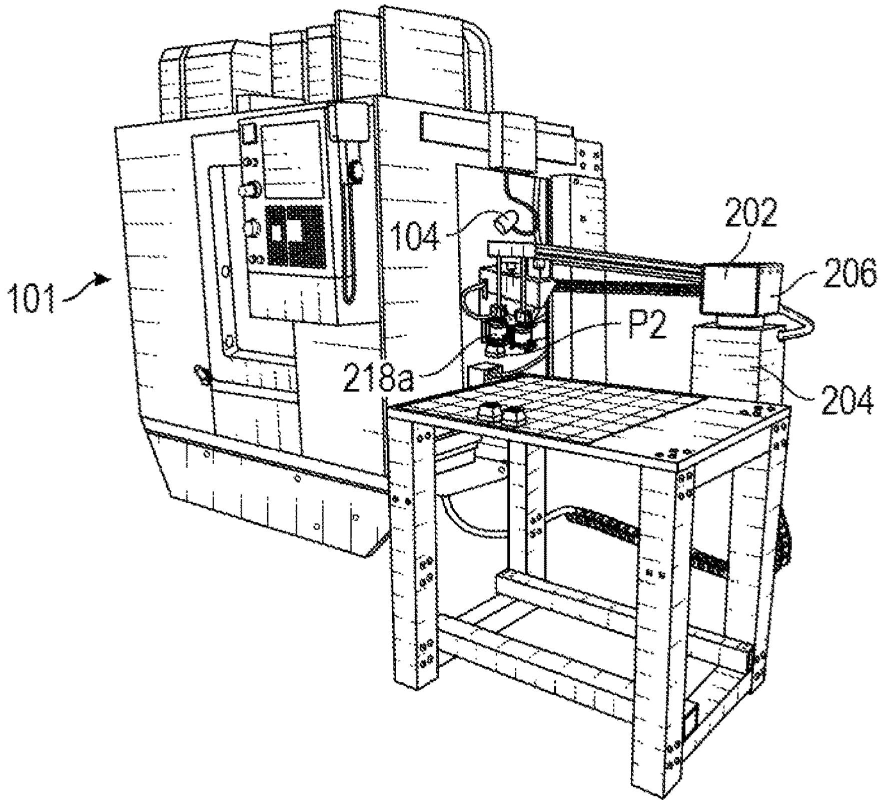
Figure 6N:
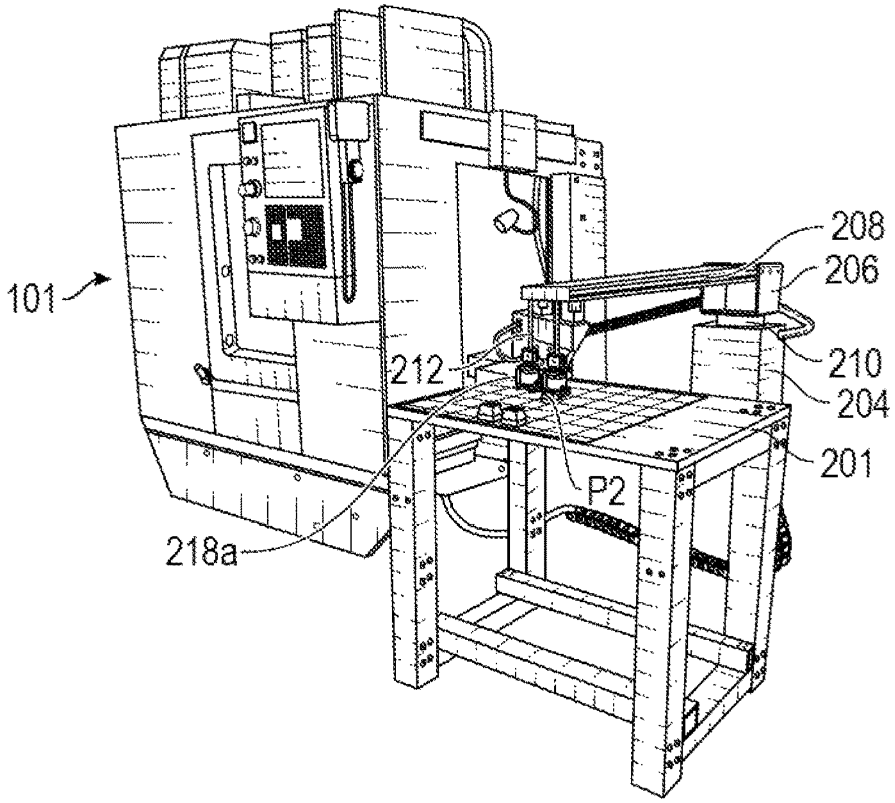
Figure 6O:
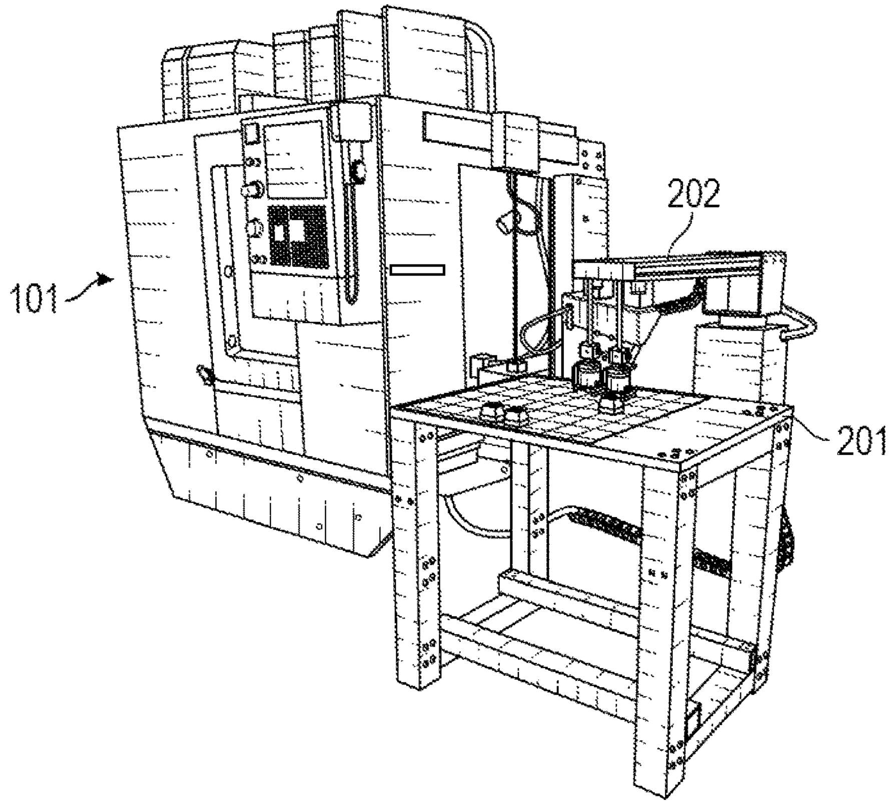
Figure 6P:
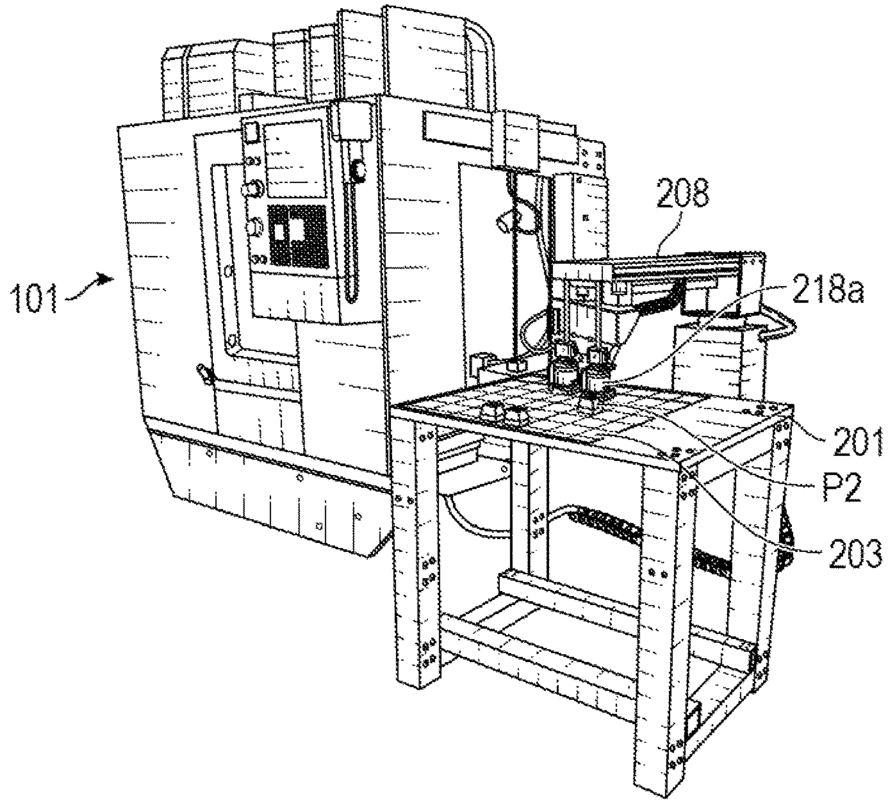
Figure 6Q:
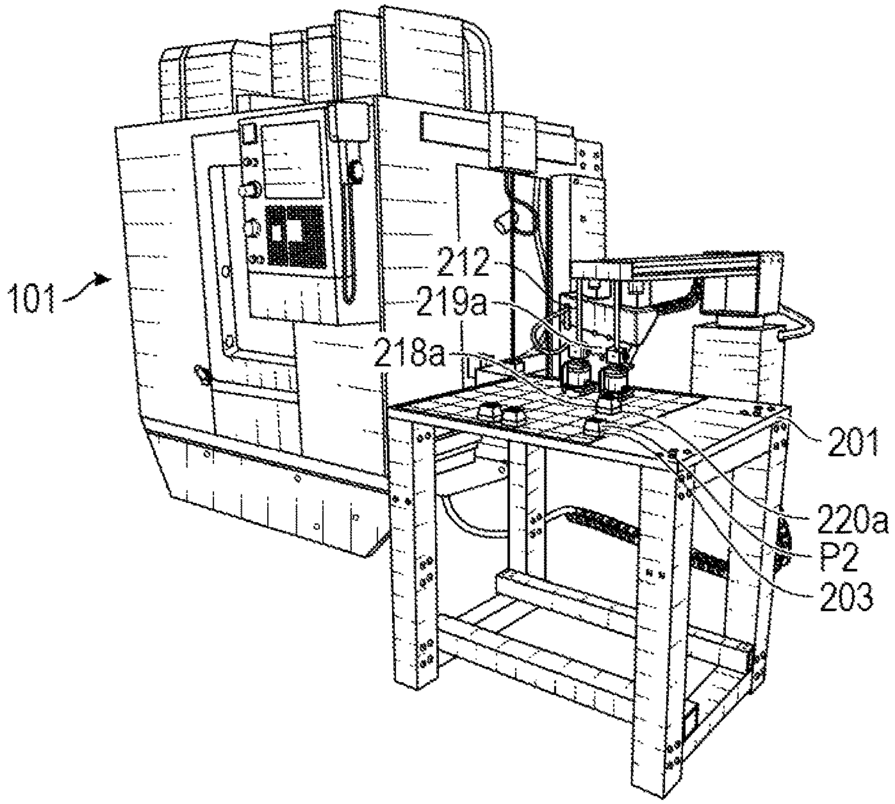
Figure 6R:
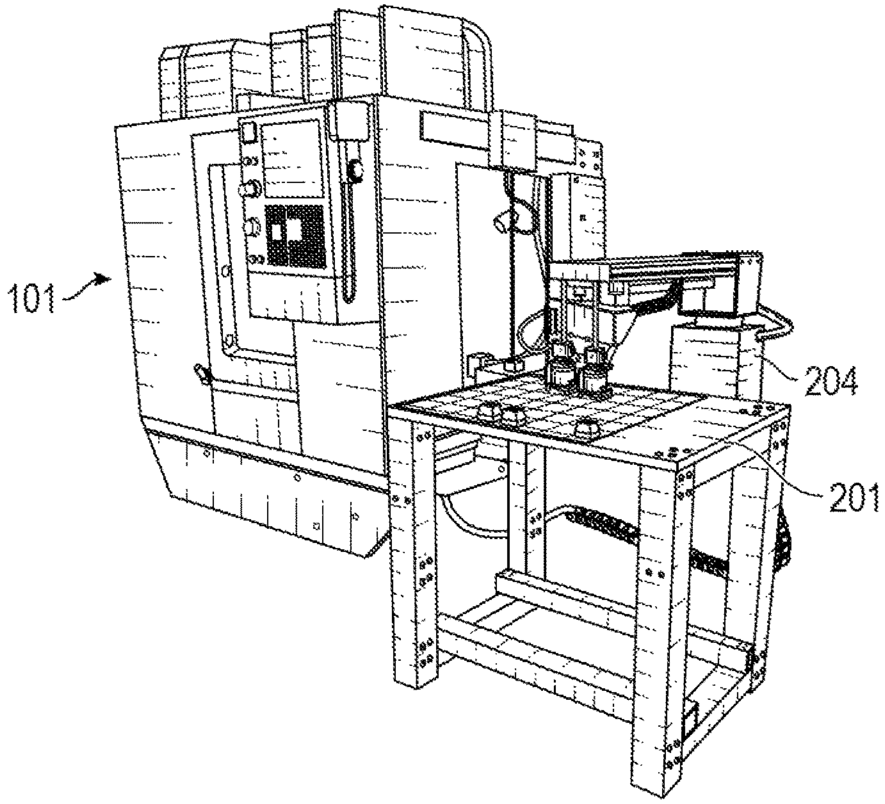
Figure 6S:
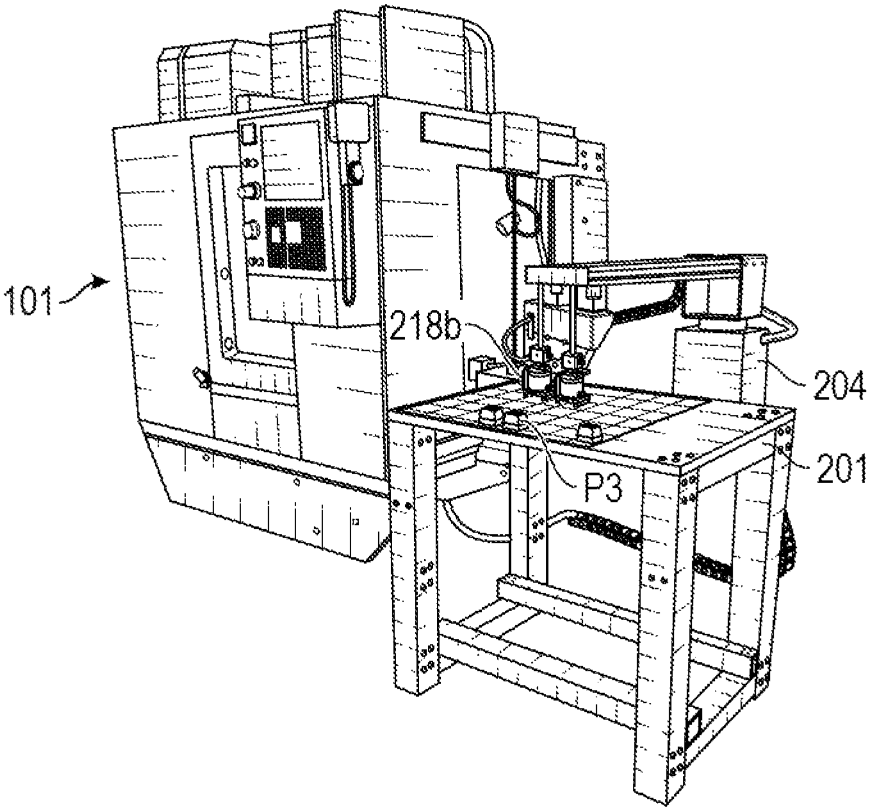

Referring now to FIGS. 6A to 6S, illustrative method steps for using loader assembly 200 for loading and unloading product parts within machine 101 are provided. As shown in FIG. 6A, in a starting configuration, loader assembly 200 may be positioned in a desired location relative to machine 101. Moreover, loader arm 202 may be positioned in a desired position relative to a target holder 203 of loading table 201, e.g., such that gripper assembly 212 is aligned with unmachined product part P1. Loader assembly 200 may be calibrated prior to operation, e.g., via the machine controller, such that gripper assembly 212 is aligned with holders 203 of loading table 201. Although FIG. 6A illustrates three product parts on loading table 201, any or all of holders 203 may hold a product part prior to operation, which may be verified via a manual inspection by the operator.

As shown in FIG. 6B, gripper assembly 212 may be actuated, e.g., via solenoid 222, to cause pneumatic piston 219*b* to linearly move gripper 218*b* downward (along the Z-axis) toward unmachined product part P1, while gripper arms 220*b* are in an expanded configuration, until gripper 218*b* engages with unmachined product part P1. Gripper arms 220*b* may then be actuated to move toward each other and clamp onto unmachined product part P1. As shown in FIG. 6C, gripper assembly 212 may then be actuated, e.g., via solenoid 222, to cause pneumatic piston 219*b* to linearly move gripper 218*b* upward (along the Z-axis), while gripper arms 220*b* holds unmachined product part P1. The machine controller may then cause loader arm 202 to move to a home configuration, as shown in FIG. 6D. In the home configuration, sliding portion 204 is in a predetermined position relative to loading table 201 to permit unobstructed rotation of rotatable portion 206 relative to sliding portion 204. Meanwhile, machine 101 may simultaneously machine/cut a product part, e.g., machined product part P2 (not shown), within machine 101.

As shown in FIG. 6E, from the home configuration, wheel bearing 210 may be actuated, e.g. via motor 240, to rotate rotatable portion 206, and accordingly extension portion 208 and gripper assembly 212 holding unmachined product part P1 via gripper 218*b,* 90 degrees, such that extension portion 208 is aligned with side door 104 of machine 101 (along the Y-axis). As described above, trigger 211 may engage with switch 205 when rotatable portion 206 reaches the halfway point between the first and second positions, thereby triggering a voltage drop of motor 240, such that the compression spring force of spring assembly 209 facilitates complete rotation of rotatable portion 206, while dampening motion of rotatable portion 206 to eliminate bounce when rotatable portion 206 reaches the final position. Sliding portion 204 may then be actuated, e.g., via motors 230, to linearly move (along the Y-axis) relative to loading table 201 and through side door 104 and into the interior of machine 101, as shown in FIG. 6F.

As shown in FIG. 6G, within machine 101, gripper 218*a* may be aligned with machined product part P2 disposed on vise 106 of machine 101. For example, vise 106 may be actuated via the machine controller to automatically move linearly to align unmachined product part P2 with gripper 218*a*. As shown in FIG. 6H, gripper assembly 212 may be actuated, e.g., via solenoid 222, to cause pneumatic piston 219*a* to linearly move gripper 218*a* downward (along the Z-axis) toward machined product part P2, while gripper arms 220*a* are in an expanded configuration, until gripper 218*a* engages with machined product part P2. Gripper arms 220*a* may then be actuated to move toward each other and clamp onto machined product part P2. As shown in FIG. 6I, gripper assembly 212 may then be actuated, e.g., via solenoid 222, to cause pneumatic piston 219*a* to linearly move gripper 218*a* upward (along the Z-axis), while gripper arms 220*a* holds machined product part P2.

Vise 106 may then be actuated by the machine controller to move linearly to align itself with gripper 218*b* and unmachined product part P1, as shown in FIG. 6J. As shown in FIG. 6K, gripper assembly 212 may be actuated, e.g., via solenoid 222, to cause pneumatic piston 219*b* to linearly move gripper 218*b* downward (along the Z-axis) toward vise 106, while gripper arms 220*b* holds unmachined product part P1. Gripper arms 220*b* may then be actuated to move away from each other to release unmachined product part P1 onto vise 106 for machining by machine 101. Gripper assembly 212 may then be actuated, e.g., via solenoid 222, to cause pneumatic piston 219*b* to linearly move gripper 218*b* upward (along the Z-axis) for unobstructed retraction of loader arm 202 from machine 101. Sliding portion 204 may then be actuated, e.g., via motors 230, to linearly move (along the Y-axis) relative to loading table 201 to retract extension portion 208 and gripper assembly 212 from the interior of machine 101 while gripper arms 220*a* hold machined product part P2, as shown in FIG. 6L.

As shown in FIG. 6M, sliding portion 204 may be actuated to linearly move relative to loading table 201 until loader arm 202 is in the home configuration, to permit unobstructed rotation of rotatable portion 206 relative to sliding portion 204. As shown in FIG. 6N, from the home configuration, wheel bearing 210 may be actuated, e.g. via motor 240, to rotate rotatable portion 206, and accordingly extension portion 208 and gripper assembly 212 holding machined product part P2 via gripper 218*a,* 90 degrees, such that extension portion 208 extends over loading table 201 (along the X-axis), as shown in FIG. 6O. Sliding portion 204 may then be actuated, e.g., via motors 230, to linearly move (along the Y-axis) relative to loading table 201 to align gripper 218*a* and machined product part P2 with a target holder 203 for unloading machined product part P2, as shown in FIG. 6P. Meanwhile, machine 101 may simultaneously machine/cut unmachined product part P1, within machine 101.

As shown in FIG. 6Q, gripper assembly 212 may be actuated, e.g., via solenoid 222, to cause pneumatic piston 219*a* to linearly move gripper 218*a* downward (along the Z-axis) toward target holder 203, while gripper arms 220*a* holds machined product part P2. Gripper arms 220*a* may then be actuated to move away from each other to release machined product part P2 onto target holder 203. Gripper assembly 212 may then be actuated, e.g., via solenoid 222 (FIG. 2A), to cause pneumatic piston 219*a* to linearly move gripper 218*a* upward (along the Z-axis), as shown in FIG. 6R. As shown in FIG. 6S, sliding portion 204 may then be actuated, e.g., via motors 230, to linearly move (along the Y-axis) relative to loading table 201 to align gripper 218*b* with the next unmachined product part, e.g., unmachined product part P3, for loading within machine 101 using the process steps described above.

Referring now to FIG. 7, an illustrative machine controller programmed with instructions for controlling both machine 101 and loader assembly 200 is provided. As shown in FIG. 7, machine controller 700 may include user interface 702, processor 704, memory 706, and motor controller 708. User interface 702 is operatively coupled to processor 704 and memory 706 for providing information to and receiving information from an operator of machine controller 700. For example, user interface 702 may be a cathode ray tube ("CRT") or LCD monitor for displaying information to the operator. User interface 702 may also include, for example, a keyboard, a mouse, a touchpad, a touch screen, and/or other device for communicating information and command selections to processor 704. For example, the operator of machine controller 700 may provide one or more inputs to machine 101 and/or loader assembly 200 via user interface 702, e.g., to start and stop operation of system 100. As described above, loader assembly 200 may be calibrated via user interface 702.

Processor 704 may comprise one or more processors, where each processor may perform different functions or execute different instructions and/or processes. For example, one or more processors may execute instructions for handling computationally intensive operations (e.g., providing input/output, user interface, and networking functionality, performing calculations, running simulations, displaying data, generating machining programs that comprise programmed commands, etc.) for machine 101, and one or more processors may execute instructions for input/output functions.

Memory 706 may be random access memory ("RAM") or other dynamic storage devices for storing information and instructions to be executed by processor 704. Memory 706 may also be used for storing temporary variables or other intermediate information during execution of instructions by processor 704. In some aspects, memory 706 may comprise battery-powered static RAM, which stores information without requiring power to maintain the stored information. Memory 706 further may include storage for storing information and instructions, e.g., flash memory. In some aspects, memory 706 may be a machine-readable medium.

According to various aspects of the subject technology, processor 704 executes instructions for handling computationally intensive operations of machine 101 and/or loader assembly 200. Processor 704 further may execute one or more sequences of instructions contained in memory 706 for automatically controlling, via motor controller 708 operatively coupled to machine 101 and loader assembly 200, the motors associated with machine 101, e.g., vise 106 and other automated machining components of machine 101, and loader assembly 200, e.g., solenoid 222, motor 230, motor 238, motor 240, and the motors associated with actuation of gripper arms 220*a*, 220*b*, as described in further detail below with regard to FIG. 8. For example, as described above, processor 704 may instruct a voltage drop of motor 240 responsive to engagement between trigger 211 and switch 205 during rotation of rotatable portion 206 relative to sliding portion 204. Accordingly, the operator may control both machine 101 and loader assembly 200 via a single machine controller 700. Further, the various motors, such as solenoid 222, motor 230, motor 238, motor 240, can be implemented by a variety for suitable types of motors, such as a solenoid, stepper motor, servo motor, DC gear motor, or any other suitable motor, and where described herein as one or the other, it will be appreciated that different types of motors might be utilized, preferably with the characteristics of being low torque, low power, low cost motors.

Figure 8:
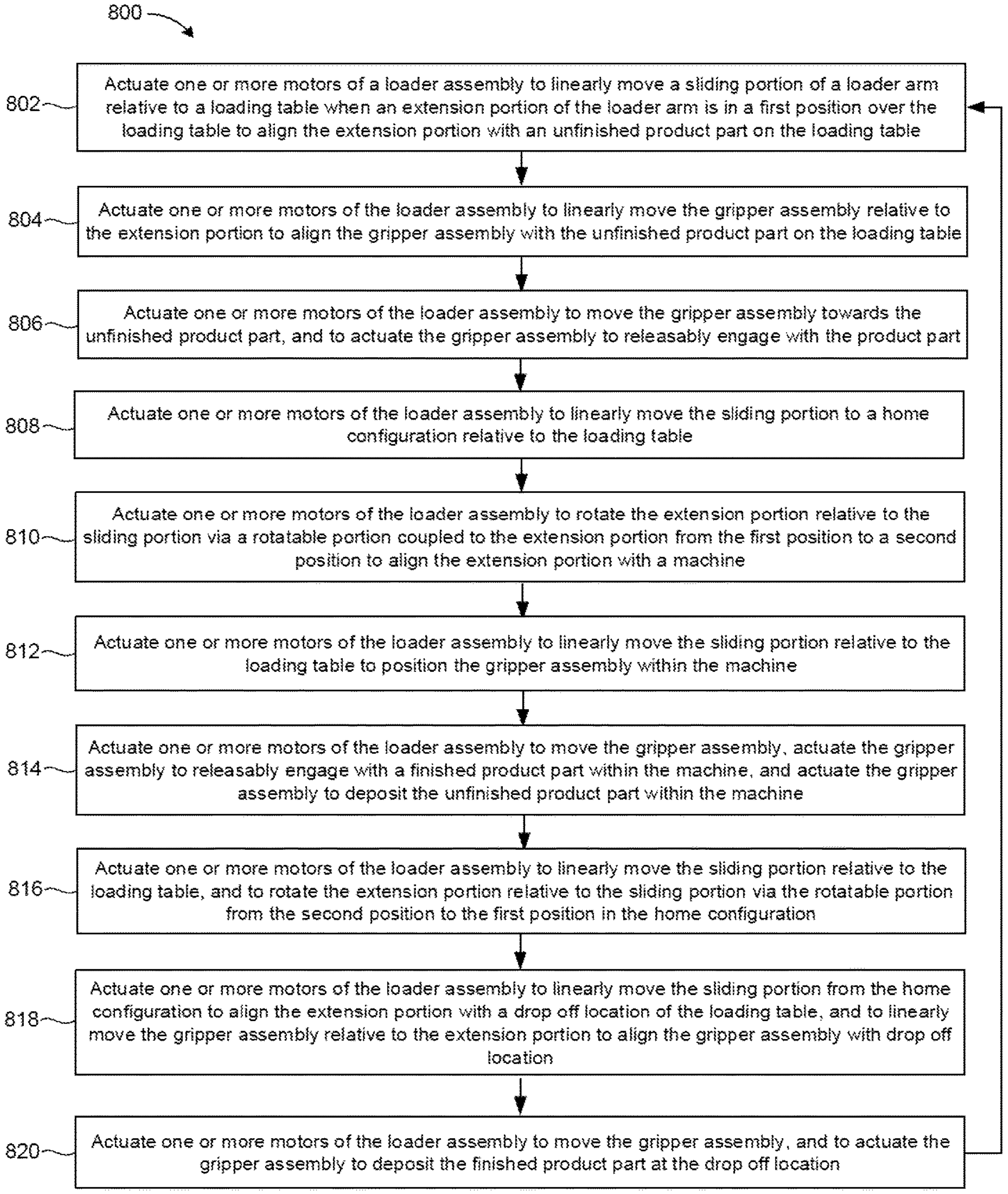
FIG. 8 illustrates an example computer implemented method, in accordance with one or more example embodiments of the disclosure.

FIG. 8 depicts an example process flow 800 in accordance with one or more example embodiments of the disclosure. Some or all of the blocks of the process flows in this disclosure may be performed in a distributed manner across any number of devices or systems, e.g. machine controller 700 or motor controller 708, and/or any other type of device, system, etc. The operations of the process flow 800 may be optional and may be performed in a different order.

At block 802, computer-executable instructions stored on the memory of a device may be executed to actuate one or more motors of loader assembly 200, e.g., motor 230, to linearly move sliding portion 204 of loader arm 202 relative to loading table 201 when extension portion 208 of loader arm 202 is in a first position over loading table 201 to align extension portion 208 with an unfinished product part on loading table 201. For example, sliding portion 204 initially may be in the home configuration relative to loading table 201, e.g., during start up, as described above, and moved from the home configuration to align extension portion 208 with the unfinished product part.

At block 804, computer-executable instructions stored on the memory of a device may be executed to actuate one or more motors of loader assembly 200, e.g., motor 238, to linearly move gripper assembly 212 relative to extension portion 208 to align gripper 218*b* of gripper assembly 212 with the unfinished product part on loading table 201.

At block 806, computer-executable instructions stored on the memory of a device may be executed to actuate one or more motors of loader assembly 200, e.g., solenoid 222, to move gripper 218*b* of gripper assembly 212 towards the unfinished product part, e.g., via pneumatic piston 219*b*, and to actuate gripper arms 220*b* of gripper 218*b* to releasably engage with the product part. Moreover, solenoid 222 further may be actuated to move gripper 218*b* upward towards extension portion 208 while gripper 218*b* is engaged with the unfinished product part.

At block 808, computer-executable instructions stored on the memory of a device may be executed to actuate motor 230 to linearly move sliding portion 204 to the home configuration relative to loading table 301. In the home configuration, extrusion portion 208 may be rotated via rotatable portion 206 relative to sliding portion 204 in a safe known manner to minimize risk of collision of extrusion portion 208 with nearby objects or personnel.

At block 810, computer-executable instructions stored on the memory of a device may be executed to actuate one or more motors of loader assembly 200, e.g., motor 240, to rotate rotatable portion 206, and accordingly, extension portion 208, relative to sliding portion 204 from the first position to a second position to align extension portion 208 with side door 104 of machine 101. As described above, upon engagement between trigger 211 and switch 205, e.g., when rotatable portion 206 is halfway between the first and second positions, computer-executable instructions stored on the memory of a device may be executed to reduce or eliminate voltage of motor 240, such that spring assembly 209 facilitates or completes rotation of rotatable portion 206 relative to sliding portion 204 towards the second position.

At block 812, computer-executable instructions stored on the memory of a device may be executed to actuate motor 230 to linearly move sliding portion 204 relative to loading table 201 to position gripper assembly 212 within machine 101.

At block 814, computer-executable instructions stored on the memory of a device may be executed to actuate solenoid 222 to move gripper 218*a* towards the finished product part on vise 106 of machine 101, and to actuate gripper arms 220*a* of gripper 218*a* to releasably engage with the finished product part. Solenoid 222 further may be actuated to move gripper 218*a* upward towards extension portion 208 while gripper 218*a* is engaged with the finished product part. Computer-executable instructions stored on the memory of a device may then be executed to actuate one or more motors of machine 101 to move vise 106 within machine 101 to align a drop off location of vise 106 with gripper 218*b* of gripper assembly 212. Computer-executable instructions stored on the memory of a device may then be executed to actuate solenoid 222 to move gripper 218*b* of gripper assembly 212 towards vise 106 of machine 101, and to actuate gripper arms 220*b* of gripper 218*b* to release and deposit the unfinished product part on vise 106. Solenoid 222 further may be actuated to move gripper 218*b* upward towards extension portion 208.

At block 816, computer-executable instructions stored on the memory of a device may be executed to actuate motor 230 to linearly move sliding portion 204 relative to loading table 201, and to actuate motor 240 and to rotate rotatable portion 206, and accordingly, extension portion 208 relative to sliding portion 204 from the second position to the first position in the home configuration. As described above, upon engagement between trigger 211 and switch 205, e.g., when rotatable portion 206 is halfway between the second and first positions, computer-executable instructions stored on the memory of a device may be executed to reduce or eliminate voltage of motor 240, such that spring assembly 209 facilitates or completes rotation of rotatable portion 206 relative to sliding portion 204 towards the first position.

At block 818, computer-executable instructions stored on the memory of a device may be executed to actuate motor 230 to linearly move sliding portion 204 from the home configuration to align extension portion 208 with a drop off location of loading table 201, and to actuate motor 238 to linearly move gripper assembly 212 relative to extension portion 208 to align gripper 218*a* of gripper assembly 212 with the drop off location.

At block 820, computer-executable instructions stored on the memory of a device may be executed to actuate solenoid 222 to move gripper 218*a* towards the drop off location of loading table 101, and to actuate gripper arms 220*a* of gripper 218*a* to deposit the finished product part at the drop off location on loading table 201. Solenoid 222 further may be actuated to move gripper 218*a* upward towards extension portion 208. Blocks 802-820 may be repeated in an automated manner.

One or more operations of the methods, process flows, or use cases of FIGS. 1-9 may have been described above as being performed by a user device, or more specifically, by one or more program module(s), applications, or the like executing on a device. It should be appreciated, however, that any of the operations of the methods, process flows, or use cases of FIGS. 1-9 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-9 may be described in the context of the illustrative devices, it should be appreciated that such operations may be implemented in connection with numerous other device configurations.

The operations described and depicted in the illustrative methods, process flows, and use cases of FIGS. 1-9 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-9 may be performed.

While various illustrative embodiments of the invention are described above, it will be apparent to one skilled in the art that various changes and modifications may be made therein without departing from the invention. The appended claims are intended to cover all such changes and modifications that fall within the true scope of the invention.

What is claimed:

1. An automated part loader system comprising:

a loading table configured to hold a plurality of product parts; and a loader arm comprising:

a sliding portion slidably coupled to the loading table, the sliding portion is configured to move linearly relative to the loading table;

a rotatable portion rotatably coupled to the sliding portion;

an elongated extension portion extending from the rotatable portion, the elongated extension portion configured to be rotated via the rotatable portion between a first position where the elongated extension portion extends over the loading table and a second position where the elongated extension portion is aligned with a machine; and a gripper assembly moveable along the elongated extension portion, the gripper assembly comprising a pair of grippers configured to be actuated to move the plurality of product parts between the loading table and the machine, wherein, when the elongated extension portion is in the first position, the sliding portion is configured to move linearly relative to the table to align the gripper assembly relative to the loading table, and when the elongated extension portion is in the second position, the sliding portion is configured to move linearly relative to the table to position the gripper assembly within the machine.

2. The automated part loader system of claim 1, wherein the rotatable portion is configured to be rotated 90 degrees relative to the sliding portion.

3. The automated part loader system of claim 1, further comprising a controller operatively coupled to the loader arm, the controller programmed to:

cause the sliding portion to move linearly relative to the loading table;

cause the rotatable portion to rotate the elongated extension portion relative to the sliding portion between the first position and the second position;

cause the gripper assembly to move linearly relative to the elongated extension portion to align the pair of grippers with the loading table when the elongated extension portion is in the first position, and to position the pair of grippers within the machine when the elongated extension portion is in the second position; and cause the pair of grippers to move relative to the elongated extension portion to releasably engage with the plurality of product parts.

4. The automated part loader system of claim 3, further comprising:

a ball screw assembly operatively coupled to the loading table and the sliding portion; and one or more motors operatively coupled to the controller and the ball screw assembly, wherein the controller is configured to actuate the one or more motors to cause the ball screw assembly to cause linear movement of the sliding portion relative to the loading table.

5. The automated part loader system of claim 4, wherein the one or more motors comprise one or more of a low voltage servo motor or a low voltage stepper motor.

6. The automated part loader system of claim 3, wherein the rotatable portion is rotatably coupled to the sliding portion via a wheel bearing, the system further comprising:

one or more motors operatively coupled to the controller and the wheel bearing, wherein the controller is configured to actuate the one or more motors to cause the wheel bearing to rotate the rotatable portion relative to the sliding portion.

7. The automated part loader system of claim 6, wherein the one or more motors comprise one or more of a low voltage servo motor or a low voltage stepper motor.

8. The automated part loader system of claim 6, further comprising:

a spring assembly coupled to the rotatable portion and the sliding portion, the spring assembly configured to dampen rotation of the rotatable portion as the rotatable portion rotates relative to the sliding portion, wherein the spring assembly achieves a maximum compression force when the rotatable portion is rotated halfway between the first position and the second position.

9. The automated part loader system of claim 8, further comprising:

a switch operatively coupled to the controller; and a trigger configured to engage the switch when the rotatable portion is rotated halfway between the first position and the second position, wherein the controller is configured to reduce voltage of the one or more motors when the trigger engages the switch, such that the compression force of the spring assembly facilitates rotation of the rotatable portion beyond halfway between the first position and the second position.

10. The automated part loader system of claim 3, further comprising:

a ball screw assembly operatively coupled to the elongated extension portion and the gripper assembly; and one or more motors operatively coupled to the controller and the ball screw assembly, wherein the controller is configured to actuate the one or more motors to cause the ball screw assembly to cause linear movement of the gripper assembly relative to the elongated extension portion.

11. The automated part loader system of claim 10, wherein the one or more motors comprise one or more low voltage servo motors.

12. The automated part loader system of claim 10, wherein the elongated extension portion comprises one or more rails, wherein the gripper assembly comprises one or more sliders configured to move along the one or more rails as the gripper assembly moves linearly relative to the elongated extension portion, and wherein the elongated extension portion comprises one or more predefined grooves sized and shaped to facilitate alignment of the one or more rails with the elongated extension portion.

13. The automated part loader system of claim 3, wherein the gripper assembly comprises a pair of actuators operatively coupled to the pair of grippers, the system further comprising:

one or more motors operatively coupled to the controller and the pair of actuators, wherein the controller is configured to actuate the one or more motors to cause the pair of actuators to cause movement of the pair of grippers.

14. The automated part loader system of claim 13, wherein the pair of actuators each comprises a pair of pneumatic pistons.

15. The automated part loader system of claim 14, further comprising an air blast tube fluidicly coupled to an extension port of a cylinder of a piston of the pair of pneumatic pistons, the air blast tube configured to redirect at least some air from the cylinder during downward movement of the pair of grippers to reduce a force applied by the pair of grippers to a product part of the plurality of product parts.

16. The automated part loader system of claim 13, wherein the one or more motors comprise one or more solenoids.

17. The automated part loader system of claim 1, further comprising the machine, the machine comprising a side door configured to provide access to the loader arm when the elongated extension portion is in the second position.

18. The automated part loader system of claim 1, wherein the loading table comprises an array of holders, each holder of the array of holders sized and shaped to hold a product part of the plurality of product parts.

19. The automated part loader system of claim 1, wherein each gripper of the pair of grippers comprises a pair of retractable gripper arms configured to be actuated to clamp and release a product part of the plurality of product parts.

20. A computer implemented system for operating a loader assembly having a loader arm slidably coupled to a loading table for use with a machine, the system comprising at least one processor configured to:

actuate one or more motors of the loader assembly to linearly move a sliding portion of the loader arm relative to the loading table when an extension portion of the loader arm is in a first position over the loading table to align the extension portion with an unfinished product part on the loading table;

actuate the one or more motors of the loader assembly to linearly move a gripper assembly relative to the extension portion to align the gripper assembly with the unfinished product part on the loading table;

actuate the one or more motors of the loader assembly to cause the gripper assembly to releasably engage with the unfinished product part;

actuate the one or more motors of the loader assembly to linearly move the sliding portion to a home configuration relative to the loading table;

actuate the one or more motors of the loader assembly to rotate the extension portion relative to the sliding portion via a rotatable portion coupled to the extension portion from the first position to a second position to align the extension portion with the machine;

actuate the one or more motors of the loader assembly to linearly move the sliding portion relative to the loading table to position the gripper assembly within the machine;

actuate the one or more motors of the loader assembly to cause the gripper assembly to releasably engage with a finished product part within the machine and deposit the unfinished product part within the machine;

actuate the one or more motors of the loader assembly to linearly move the sliding portion relative to the loading table, and to rotate the extension portion relative to the sliding portion via the rotatable portion from the second position to the first position in the home configuration;

actuate the one or more motors of the loader assembly to linearly move the sliding portion from the home configuration to align the extension portion with a drop off location of the loading table, and to linearly move the gripper assembly relative to the extension portion to align the gripper assembly with the drop off location; and actuate the one or more motors of the loader assembly to cause the gripper assembly to deposit the finished product part at the drop off location.

* * * * *